United States Patent [19]
Podevels et al.

[11] Patent Number: 5,101,745
[45] Date of Patent: Apr. 7, 1992

[54] METHOD AND APPARATUS FOR SOIL CULTIVATION BY HIGH PRESSURE INJECTION OF FLUIDS

[75] Inventors: Dean A. Podevels, Chanhassen; Robert C. Comer, Hopkins; Dana R. Lonn, Minneapolis; David J. Scherbring, Shakopee, all of Minn.; John M. Beattie, Greeley, Colo.; Charles C. Holley; Michael T. Schmidt, both of Bloomington, Minn.

[73] Assignee: The Toro Company, Minneapolis, Minn.

[21] Appl. No.: 745,990

[22] Filed: Aug. 8, 1991

Related U.S. Application Data

[63] Continuation of Ser. No. 434,381, Nov. 13, 1989, abandoned.

[51] Int. Cl.$^5$ .................. A01C 23/02; A01D 45/02
[52] U.S. Cl. .................. 111/127; 111/901; 111/115; 111/175; 172/21
[58] Field of Search .......... 111/127, 108, 110, 115, 111/120, 7.1-7.4, 129, 174, 901, 902, 175; 239/163, 159, 172, 566, 157, 754; 172/20, 21

[56] References Cited

U.S. PATENT DOCUMENTS

| | | | |
|---|---|---|---|
| 1,627,422 | 5/1927 | Wike | 172/21 |
| 2,262,546 | 11/1941 | Donoho et al. | 111/901 X |
| 2,314,035 | 3/1943 | Dontje | 172/21 |
| 2,422,729 | 6/1947 | Helbig | 172/21 |
| 2,876,013 | 3/1959 | Neff | 111/901 X |
| 2,930,334 | 3/1960 | Marron et al. | 111/127 |
| 3,012,526 | 12/1961 | Baldwin et al. | 111/127 |
| 3,160,123 | 12/1964 | Roquemore | 111/901 X |
| 3,653,330 | 4/1972 | Williams | 222/136 |
| 3,875,876 | 4/1975 | Pustovoit et al. | 111/1 |
| 4,074,858 | 2/1978 | Burns et al. | 111/127 X |
| 4,392,611 | 7/1983 | Bachman et al. | 239/74 |
| 4,523,280 | 6/1985 | Bachman | 364/424 |
| 4,624,193 | 11/1986 | Johnston | 111/127 |
| 4,970,973 | 11/1990 | Lyle et al. | 111/127 |

FOREIGN PATENT DOCUMENTS

| | | | |
|---|---|---|---|
| 252906 | 5/1963 | Australia | 172/21 |
| 2164231 | 3/1986 | United Kingdom | 172/21 |

Primary Examiner—Danton D. DeMille
Attorney, Agent, or Firm—Merchant, Gould, Smith, Edell, Welter & Schmidt

[57] ABSTRACT

An apparatus and method is disclcosed for cultivating soil and turf by utilization of pressurized liquid injected into the soil and turf. A roller assembly (33) is provided for applying mechanical pressure to the turf after cultivation. Further, a means for setting a first speed in a transport mode and a second speed in a cultivating mode is provided. The apparatus is designed to be bidirectional to allow the apparatus to be used in both a forward and reverse direction. The flow of the pressurized liquid is controlled to be at intervals of from about 0.010 to 0.065 seconds and at pressures from about 2,300 psi to about 5,500 psi through nozzles having diameters of from about 0.033 to about 0.090 inches. The apparatus (10) utilizes a water hammer effect to effect the flow of pressurized liquid out of the nozzles 55 and has found a relationship in the pressure and pounds per square inch of the cross-sectional area of the bore of the manifold to the accumulated area of the output ports of the nozzles.

6 Claims, 14 Drawing Sheets

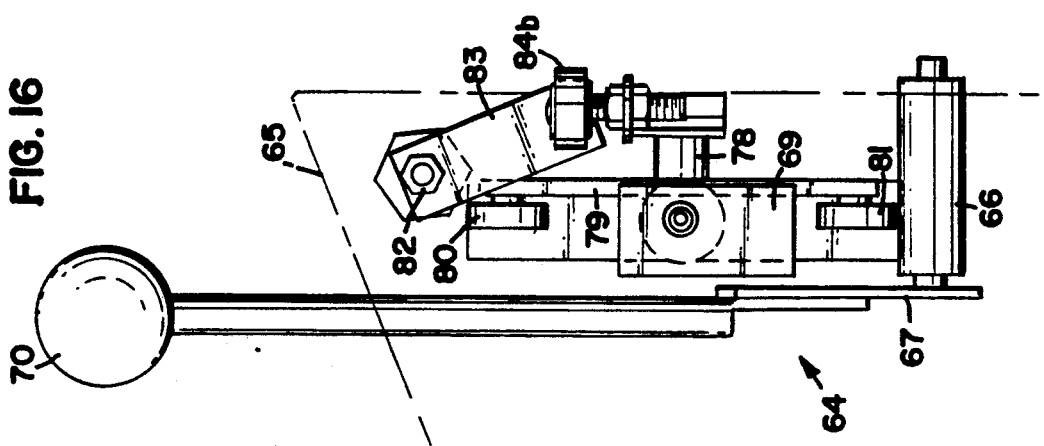
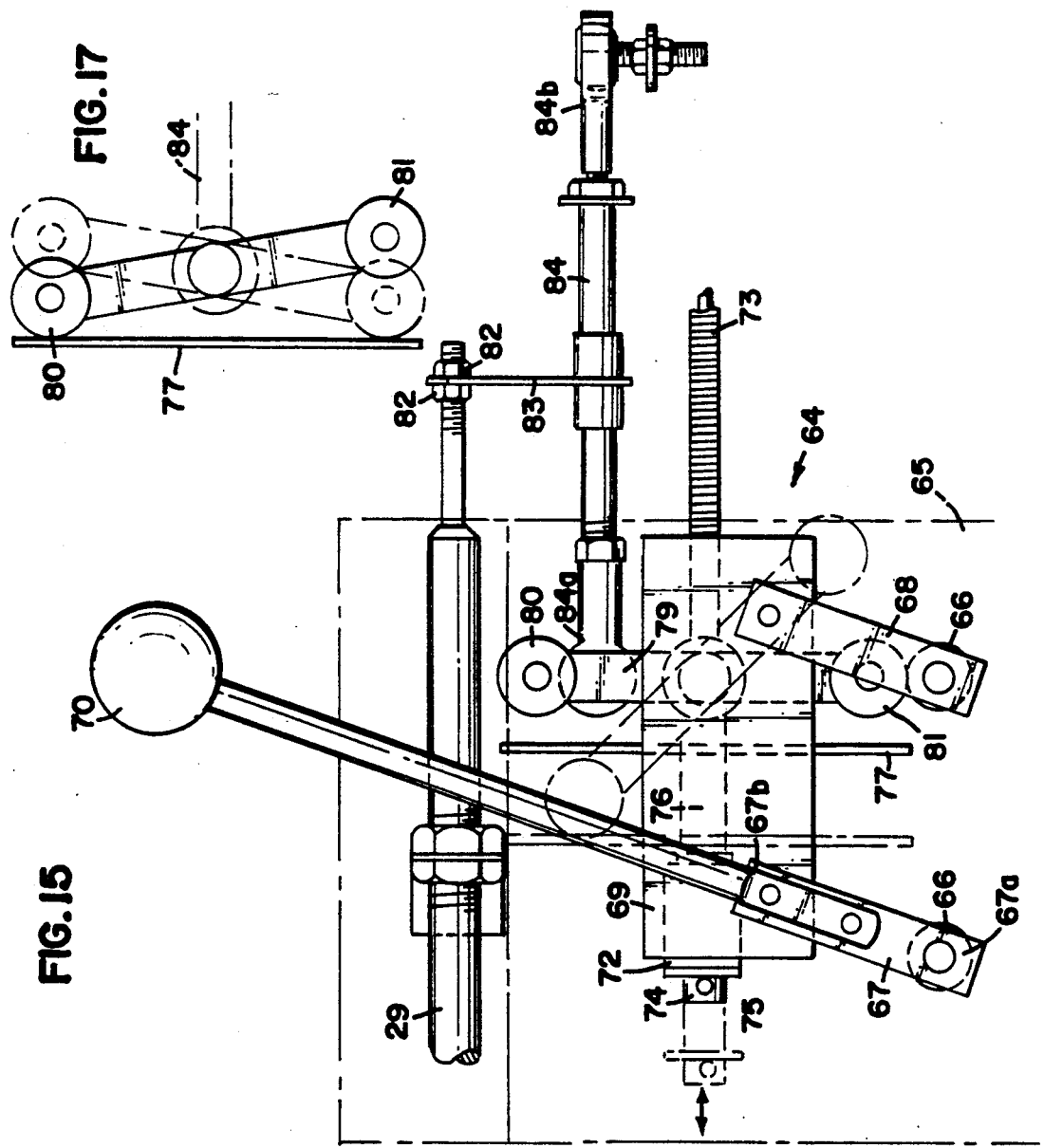

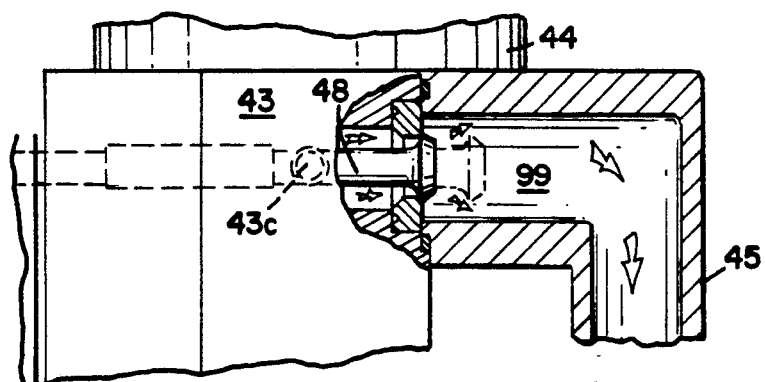
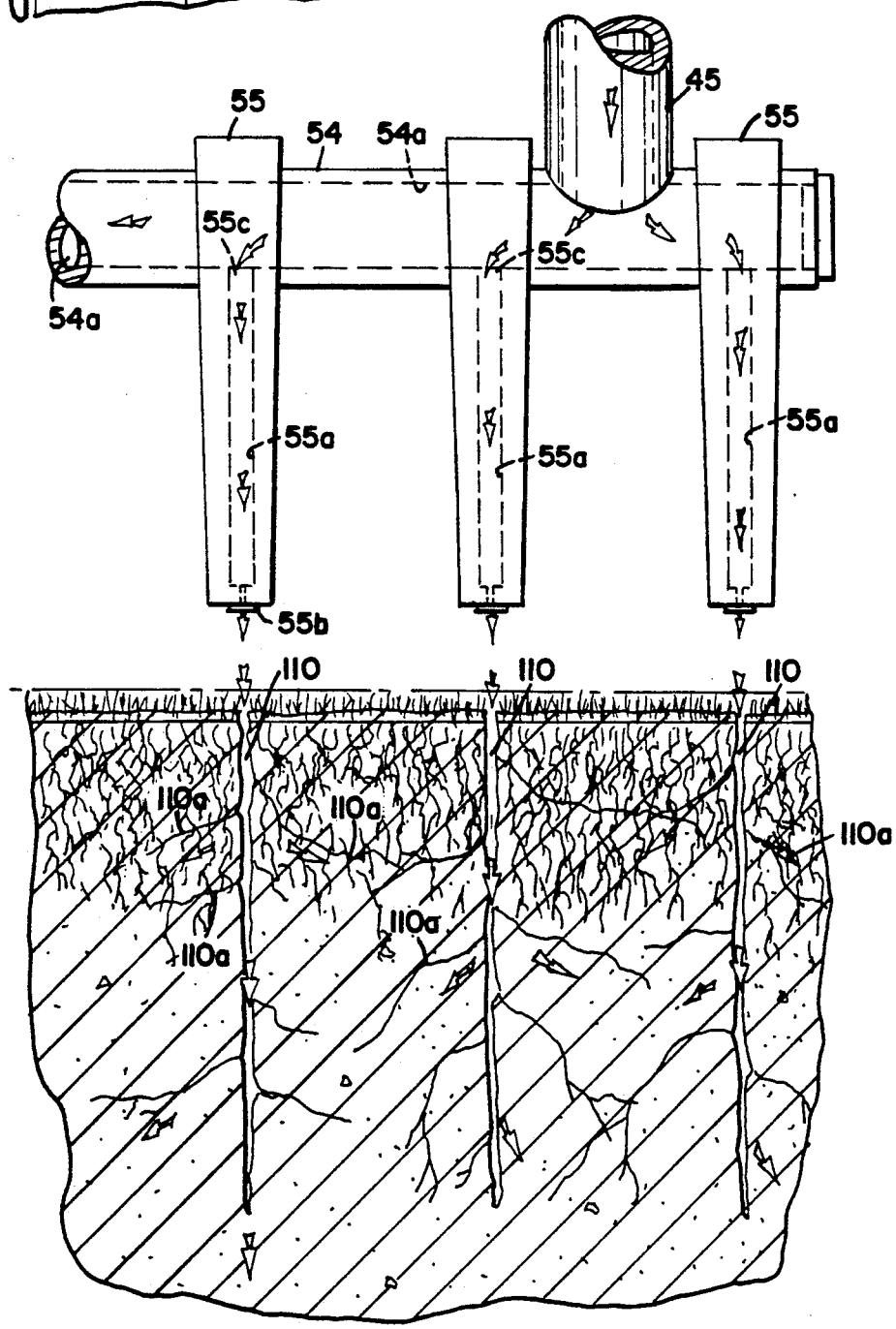
FIG. 19

METHOD AND APPARATUS FOR SOIL CULTIVATION BY HIGH PRESSURE INJECTION OF FLUIDS

This is a continuation of application Ser. No. 07/434,381, filed Nov. 13, 1989, which was abandoned upon the filing hereof.

BACKGROUND OF THE INVENTION

I. Field of the Invention

This invention relates generally to a method and apparatus for cultivating turf and more particularly to a method and apparatus which utilizes the discharge of a high pressure fluid to cultivate and aerate turf.

II. Discussion of the Prior Art

Turfgrasses are utilized for functional, recreational and aesthetic purposes, including, but not limited to, the playing surfaces of turf facilities among them golf courses, parks, sports fields, cemeteries, highway rights of ways and industrial and home lawns. While this specification will discuss turf maintenance specifically with respect to golf course greens, it is to be understood that these maintenance problems exist with all turf surfaces.

Intensive use of a turf area and maintenance operations often result in turf wear and soil compaction. This compaction reduces large, or macro, pore space and total pore space in the soil which in turn reduces water infiltration into the soil, percolation through the soil, and drainage through the soil; limits exchange of soil gases, especially soil oxygen, with the atmosphere; and tends to restrict and reduce root growth and development of turfgrasses, for example, causing, in some cases, substantial reduction of the root system and often death of deeper roots.

The proper cultivation of turf to enhance drainage, and thereby thorough root growth, and improve the soil-air-water relationship has long been a problem within the industry, and a great number of devices have been proposed in the past in an effort to find a solution.

Core cultivation (aerification) is widely utilized as a long-term program to alleviate compacted conditions in the soil root zone. Several different types of core cultivation equipment are available commercially. One such type is the Toro Greensarator. Core cultivation equipment utilize vertically operating hollow metal tines which are forcibly driven into the turf to a depth of 2½ to 3 inches to extract a plug, or core, of the turf which is then deposited on the turf surface of the green. (In some instances the cores are collected and removed from the green).

Research has shown that core cultivation creates a serious problem. Repeatedly forcing the metal tines into the turf to a common depth will, over time, create a compacted subsurface layer of soil, sometimes called plow sole, at a depth about one inch deeper than the length of the tines, in other words at about 3½ to 4 inches below the surface of the turf. Further, the metal tines also tend to glaze the soil and create some compaction along the sides of the coring hole. This subsurface compaction creates two major problems with proper turf management. First, the compacted layer interferes with proper water movement within the soil, and second the compacted layer interferes with proper root growth of the turf grasses. In addition to the compaction problem, core cultivation creates another problem—the removal or utilization of the removed turf cores. Present techniques often leave a golf green unplayable for two to three days after treatment, The present invention provides a method and apparatus which will allow immediate turf and subsoil treatment at the time treatment is needed rather than waiting for a convenient time.

The present invention is a unique method and apparatus for accomplishing subsoil cultivation which utilizes periodic turf and soil injection of a substantially incompressible liquid, such as water, in a pattern, and at sufficient pressure, to lift and fracture the soil to reduce the compaction, or general density, of the treated area. There are numerous prior art disclosures which use incompressible liquids for turf treatment, however, none of these references teach or suggest subsoil cultivation through the use of liquid injection to reduce soil density.

Marron et al., U.S. Pat. No. 2,930,334 discloses an apparatus for injecting liquid compounds such as liquid fertilizers or weed killers into the turf to be treated. Marron '334 gives no indication of any jet pressures, nor does Marron suggest liquid injection for the purpose of reducing the general turf density. Indeed, Marron teaches the sequential operation of a series of liquid injection nozzles such that the pattern generated could not create a significant reduction in soil density.

Baldwin et al., U.S. Pat. No. 3,012,526 discloses a method for injecting liquids into soil by imparting, through the application of high pressure, a high velocity to a slug of liquid to cause the unconfined liquid slug to penetrate the soil. More particularly, Baldwin is directed to a method of injecting liquids such as soil fumigants, liquid fertilizers, and insecticides by jet penetration. Nothing in the Baldwin teaches or suggests the pressures or injection spacing necessary to significantly reduce the general density of the treated soil.

Johnston, U.S. Pat. No. 2,988,025, and its Reissue U.S. Pat. No. Re. 25,307 relate to methods of imparting highly volatile liquids, such as anhydrous ammonia, into soil for the purpose of fertilization or fumigation. Neither of the Johnston references teaches or suggests the utilization of pressurized liquid injection to reduce compaction, or in other words, to reduce the general soil density so as to improve drainage or turfgrass growth.

Johnston, U.S. Pat. No. 3,521,819 discloses a hydraulic device for intermittently injecting slugs of liquid under pressure into the soil. Johnston '819 is specifically described as an improved apparatus for carrying out the invention described in Baldwin, U.S. Pat. No. 3,012,526 discussed above. Nowhere does the '819 patent, either alone or in combination with the Baldwin reference, suggest a method or apparatus for reducing the general density of the soil in order to improve its drainage and thereby enhance root growth.

Collins, U.S. Pat. No. 3,926,131 and its continuation-in-part U.S. Pat. No. 4,034,686 disclose turf treating equipment which utilize liquid injection tongs, or tines, which are mechanically driven into the soil to be treated. Each of the tongs has a nozzle adjacent its tip so that liquid can be injected into the turf after the tong is buried in the turf. Neither of the Collins references teaches or suggests the injection of slugs, or jets, of liquid at a pressure and spacing sufficient to reduce the general density of the treated turf.

Russell et al., U.S. Pat. No. 4,009,666 discloses an apparatus for injecting liquids below the surface of the turf. The '666 patent describes the application of a continuous stream of liquid rather than the application of periodic slugs, or jets, of pressurized liquid. Nothing in the Russell patent teaches or suggests a method or apparatus for reducing the general density of the treated turf.

Johnston, U.S. Pat. No. 4,624,193 is directed to a method and apparatus for the jet injection of liquids into the soil. More particularly, the '193 reference pertains to the application of agricultural liquids to plants rather than the treatment of turf. Nothing in the Johnston '193 patent teaches or suggests either the pressures or pattern spacing necessary to accomplish a general reduction in soil density.

The present invention address the shortcomings of the above-noted devices and methods as they are utilized for cultivating turf and in particular golf fairways and golf greens. The previously discussed devices are not suitable for cultivating by means of only hydraulic pressure, turfs such as golf greens. In addition to being specifically designed for such purposes, the present device and methods also utilize several new features which provide for an improved hydraulic cultivator.

These features include applying mechanical pressure to the turf after the subsoil under the turf has been cultivated. The prior art devices did not address the problems associate with indentations which can be caused on turf after it has been cultivated. The prior art devices did not give consideration to the indentations which would be left by the wheels of the apparatus after the subsoil had been cultivated.

In addition, another feature of the present invention is a means for setting a first speed when in a transport mode and a second speed when in a cultivating mode. Still further, the speed control during the cultivating mode is constructed such that there is always the same set speed in a first direction as in the second direction, which is 180° from the first direction. This provides for even hole spacing while the apparatus is being utilized in a bidirectional manner. Such features are not addressed by the prior art.

Still further, the apparatus provides for a valve which is able to have its valve seat concentric with the valve stem as well as controlling the timing of the flow through the nozzles between 0.007 to about 0.065 seconds. Such a feature is not addressed by the prior art.

Still further, Applicants have found that it is advantageous to utilize a water hammer effect in their apparatus. In doing so, they have discovered there is a relationship between the cross-sectional area of the bore and the accumulated area of the nozzle output ports. The prior art does not disclose taking advantage of this effect.

SUMMARY OF THE INVENTION

The present invention provides a method for aerating a turf such as golf greens from a moving apparatus. The method includes the steps of providing a source of pressurized liquid which receives a supply of liquid and distributing the pressurized liquid to multiple nozzles and traversing the nozzles across the golf green. The flow of the pressurized liquid is directed through the nozzles into the golf green to aerate the soil. The release of the pressurized liquid is timed to make successive holes in the golf green. In a preferred embodiment, the liquid is pressurized to at least about 2,300 psi and includes applying mechanical pressure to the golf green proximate the nozzles while traversing the golf green. Further, the timing release allows for flow of liquid from the nozzles for between about 0.007 to 0.065 second and preferably between about 0.007 to 0.020 second.

invention also includes an apparatus for cultivating turf by hydraulic action and includes a frame and means operatively connected to the frame for propelling the apparatus over the turf to be cultivated. A plurality of fluid nozzles are operatively connected to the frame. Each of the nozzles has inlet and outlet ports. There is further provided means operatively connected to the frame for pressurizing the liquid. The nozzles are in fluid communication with the pressurizing means. Means for providing a source of liquid to be in fluid communication with the pressurizing means is also provided. Still further, means for controlling the flow of the liquid from the pressurizing means to the inlet ports is utilized whereby the liquid exits the outlet ports at a pressure sufficient to cause the liquid to penetrate the turf and create aeration holes. Still further, the apparatus includes means for setting a first speed when the apparatus is in a transport mode and setting a second speed when the apparatus is in an aerating mode.

The present invention also includes an apparatus for cultivating turf by hydraulic action including a frame and means operatively connected to the frame for propelling the apparatus over the turf to be cultivated. A plurality of fluid nozzles are operatively connected to the frame, each of the nozzles having an inlet and outlet port. The nozzles are positioned generally transverse to a direction of travel. Means for pressurizing the liquid is operatively connected to the frame. The nozzles are in fluid communication with the pressurizing means. The apparatus further includes means for providing a source of liquid to be in fluid communication with the pressurizing means. Means for controlling the flow of the liquid from the pressurizing means to the inlet ports is provided, whereby the liquid exits the outlet ports at a pressure sufficient to cause the liquid to penetrate the turf and create aeration holes. A first roller having first and second ends is positioned transverse to the direction of travel and positioned on a first side of the nozzles. A second roller having first and second ends is operatively connected to the frame on a second side of the nozzles, wherein the turf is rolled both before and after aeration whether the apparatus is going either forward or backward.

The present invention also includes an apparatus for cultivating turf by hydraulic action and includes a frame and means operatively connected to the frame for propelling the apparatus over the turf to be cultivated. A plurality of fluid nozzles are operatively connected to the frame. Each of the nozzles have an inlet and outlet port. Further provided is means for pressurizing liquid which is operatively connected to the frame. The nozzles are in fluid communication with the pressurizing means. Means for providing a source of liquid to be in fluid communication with the pressurizing means is provided, as is means for controlling the flow of liquid from the pressurizing means to the inlet ports, whereby the liquid exits the outlet ports at a pressure sufficient to cause the liquid to penetrate the turf and create aeration holes. The nozzles are preferably positioned up to about 5 inches above the turf.

BRIEF DESCRIPTION OF THE DRAWINGS

FIG. 15 is a left side elevational view of the control linkage of the cultivator shown in FIG. 1;

FIG. 16 is a front elevational view of the linkage shown in FIG. 15;

FIG. 17 is a schematic representation of the control linkage of FIG. 15 showing both the forward and reverse direction while in the cultivating mode;

FIG. 19 is a cross-sectional view of the manifold nozzle system of the apparatus shown in FIG. 1 as well as a cross-sectional view of the turf being cultivated.

DETAILED DESCRIPTION OF THE PREFERRED EMBODIMENT

Figure 1:
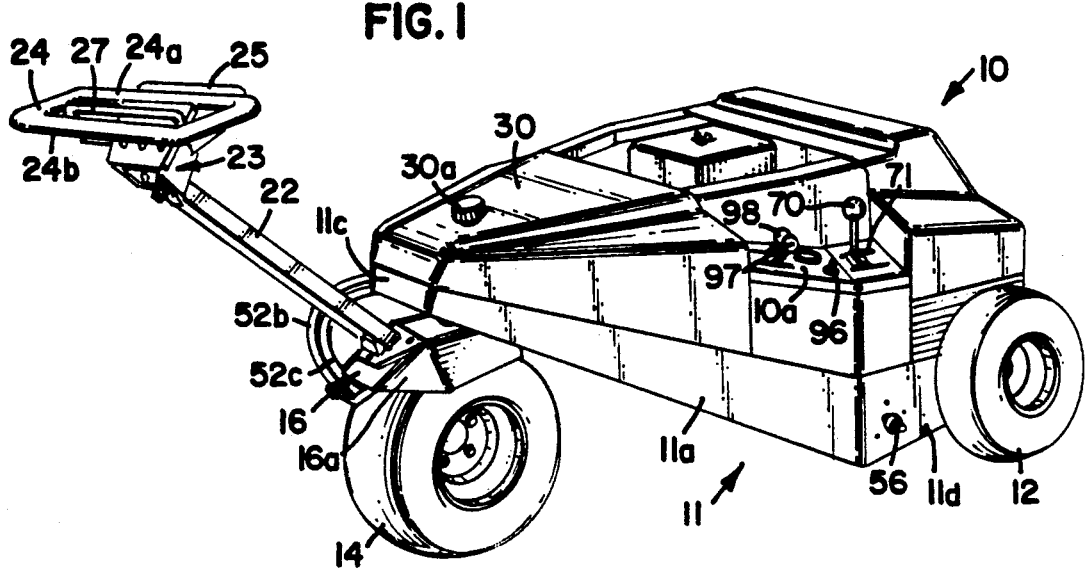
FIG. 1 is a perspective view showing one embodiment of the hydraulic cultivator of the present invention.

Being filed concurrently herewith is an application by Robert C. Comer, one of the Applicants of the present application, entitled Method and Apparatus For Treating Turf and is hereby incorporated by reference. Referring to the drawings, wherein like numerals represent like parts throughout the several views, there is generally disclosed at 10 an apparatus for treating turf and reducing turf density. The apparatus 10 includes a frame generally designated at 11. The frame 11 includes a left rear side 11a operatively connected to a right rear side 11b by a rear member 11c. The left side 11a and right side 11b slope generally downward from the horizon and connect operatively to a left front side 11d and a right side 11e, respectively. A front member 11f is operatively connected between the left front side 11d and right front side 11e. A rear cross piece member 11g is operatively connected between the left rear side 11a and right rear side 11b proximate where the left side 11a meets the left front side 11d and where the right rear side 11b meets the right front side 11e. Similarly, a front cross piece member 11h is operatively connected to the left front side 11d and the right front side 11e. The members of the frame 11a–11h may be suitably connected to each other by any appropriate means such as welding or other fasteners such as nuts and bolts. The frame 11 forms a support for mounting the various components (to be described hereafter) of the apparatus 10.

Figure 14:
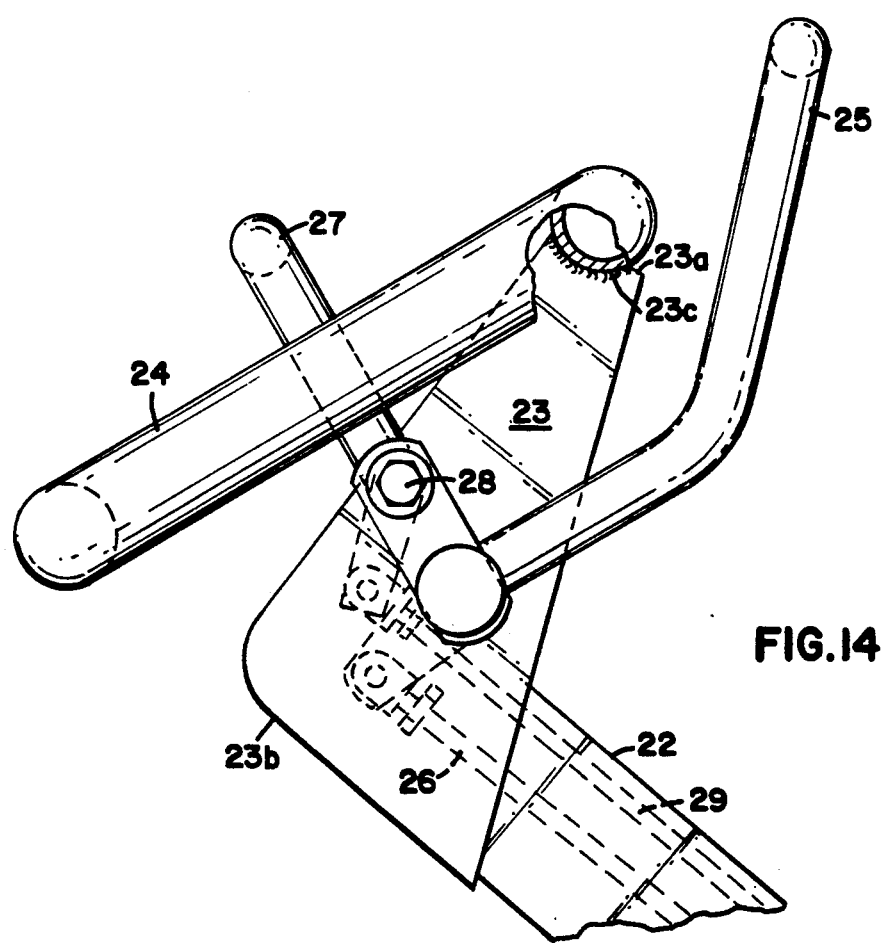
FIG. 14 is a left side elevational view of the tiller control section of the cultivator shown in FIG. 1.

The frame 11 is supported in part by three wheels 12–14. The left front wheel 12 is operatively connected to the frame 11d by means of torsion axle 12a and the right front wheel 13 is operatively connected to right front side 11e by axle 12a. The type of connection for the left front wheel 12 and right front wheel 13 will be more fully described hereafter. A steerable rear wheel 14 has a hydraulic motor 15 operatively connected to its axle by means well known in the art. The hydraulic drive motor 15 has a mounting bracket 15a operatively connected to the motor. The mounting bracket 15a is operatively connected to a steering mount assembly 16. The top of the steering mount assembly 16 has a dome shaped top 16a which partially covers the top of the tire 14. A side bracket 16b is operatively connected to the dome shaped top 16a by suitable means such as welding or formed from a single piece of metal. The side bracket 16b has an opening 16c slightly larger than the hydraulic drive motor 15 such as a high torque low speed wheel motor #114-9 from Parker Hannifin Corp. The side bracket 16b is operatively connected to the mounting bracket 15a by four bolts 17. A shaft 18 is operatively connected to the dome shaped top 16 and is secured thereto by suitable means such as welding. The shaft 18 extends up to and in to a bearing 19 which is mounted in plate 18b which is mounted to the front 11c of the frame 11. The shaft 18 is rotatable in the bearing 19. A mounting bracket 20 is operatively connected to the top 16 a by means of four bolts 21. Operatively connected to the mounting bracket, by suitable means such as welding, is an elongate steering fork 22. Preferably, the fork 22 is hollow to accommodate control wires and cables, to be more fully described hereafter. A handle support bracket 23 is rigidly connected to the second end of the steering fork 22 by suitable means such as welding. The handle bracket 23 has a top edge 23a and a bottom edge 23b. The top edge 23a has formed therein an elongate slot 23c which is sized and configured to receive a handle 24. The handle 24 may be made of any suitable material such as tubing having a circular cross section. The top portion 24a of the handle 24 fits in the slot 23 and is welded to secure the handle 24 firmly to the handle support bracket 23. The bottom portion 24b of the handle 24 is positioned just above the bottom edge 23b. A parking brake handle 25 is pivotally mounted on the handle support bracket 23 by suitable means well known in the art. By suitable linkage, a cable 26 is linked to the parking brake handle 25. Accordingly, rotational movement of the parking brake handle 25 downward, as shown in FIG. 14, will result in movement of the cable 26 which is attached at its other end to the parking brake (not shown), which cooperates with rear wheel brake 14. A traction control bar 27 is also pivotally mounted to the handle support bracket 23 by suitable means such as bolts 28. Rotational movement of the traction control bar 27 forward moves the cable 29 in a first direction and rotational movement backward causes movement of the cable 29 in an opposite second direction such linkage being well known in the art. It may be desirable to have the parking brake lever pivot from a different point than the traction control so that pivoting the parking brake lever does not accidently rotate the traction control lever.

Figure 8:
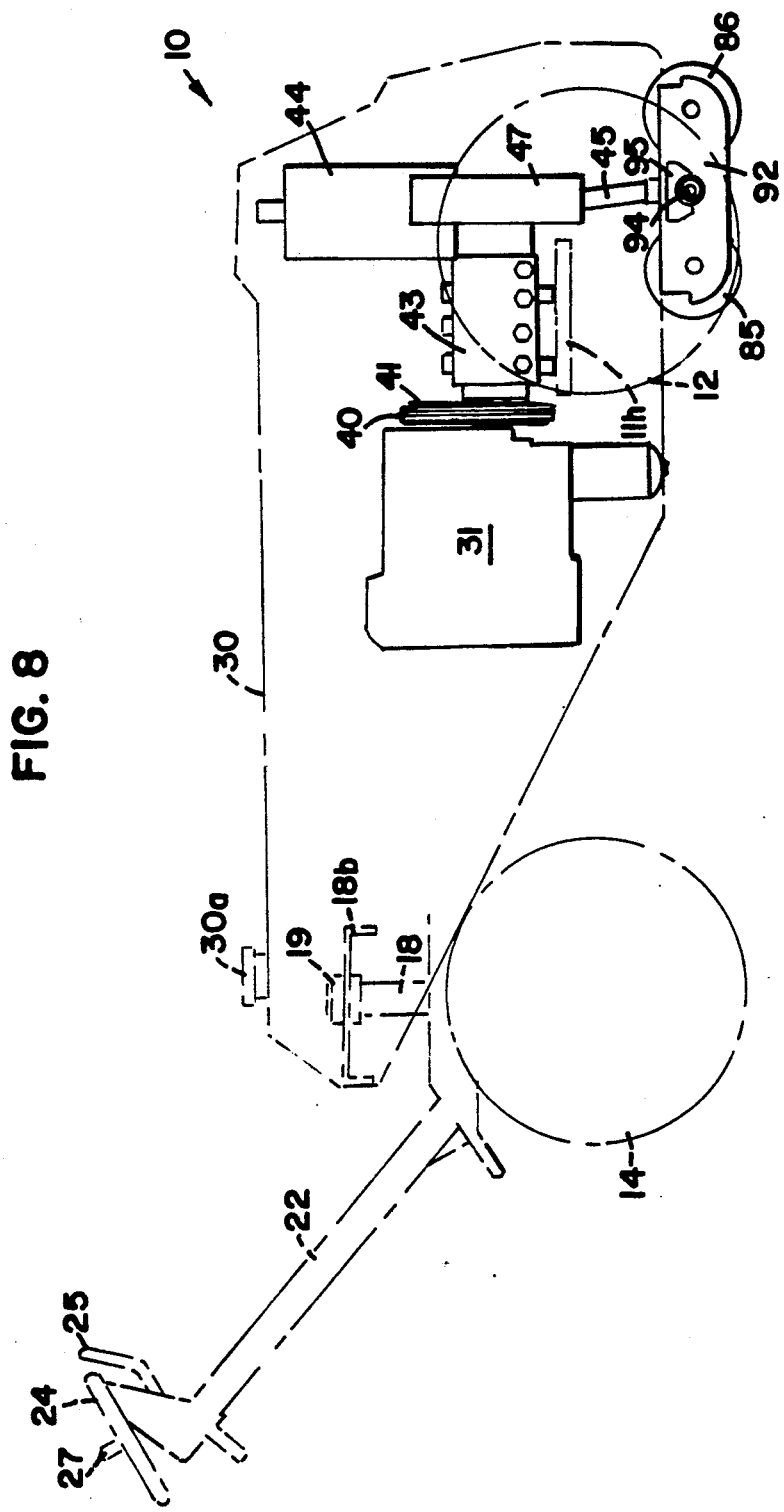
FIG. 8 is a left side elevational view of the cultivator shown in FIG. 1, with the outline of the cultivator being shown in phantom and showing some inner components thereof.
Figure 9:
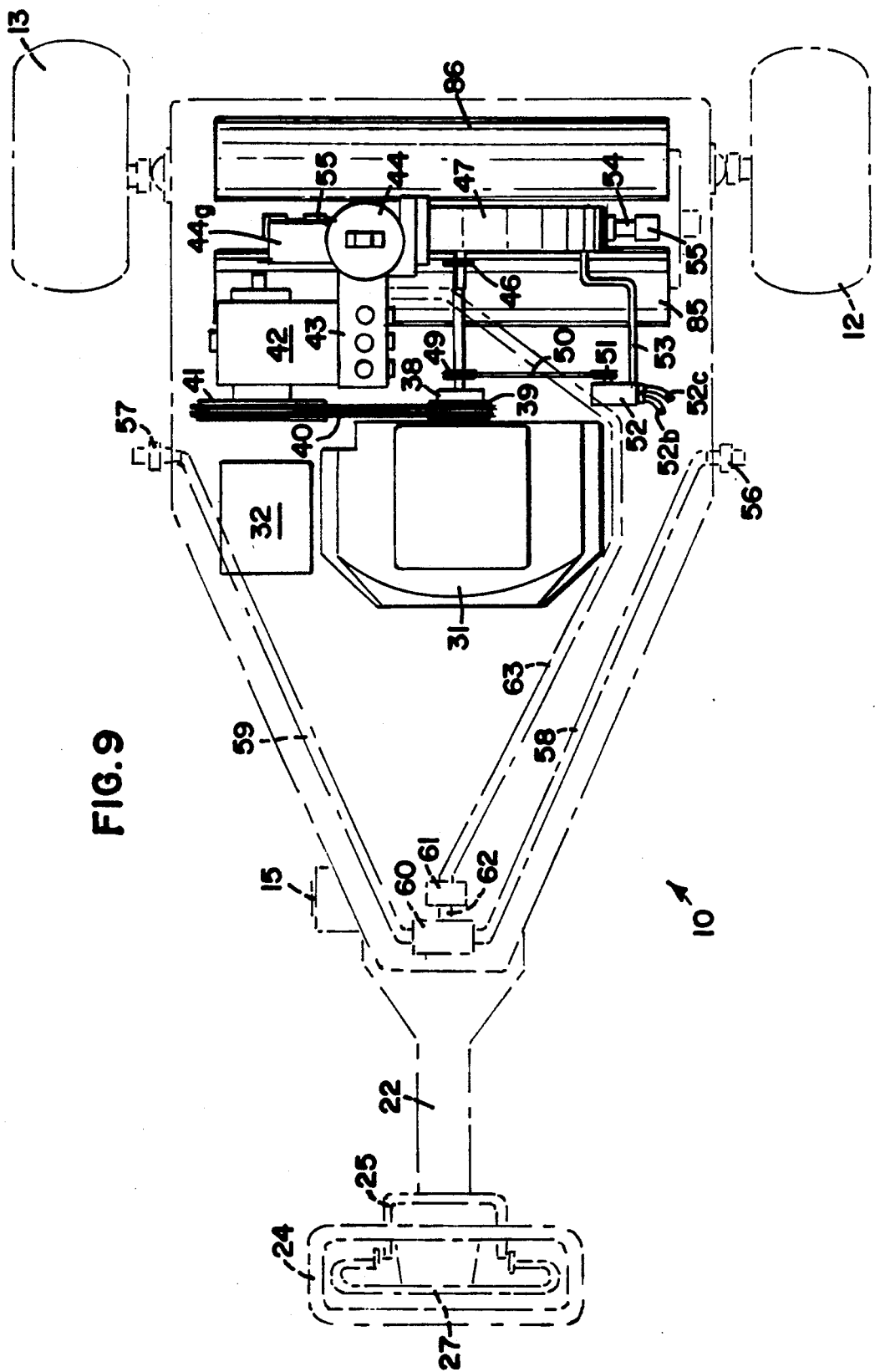
FIG. 9 is a top plan view of the cultivator shown in FIG. 1 with portions thereof being shown in phantom, and showing some of the inner components.

A gas tank 30 is positioned on the rear end of the frame 11 and is operatively connected thereto. The gas tank 30 has a fill cap 30a through which gasoline may be poured. Gasoline passes through a line and shut off valve (not shown) from the gas tank 30 to the gasoline motor 31 (FIGS. 8 and 9). The motor 31 is mounted by suitable motor mounts (not shown) to the rear cross piece member 11g. The motor 31 may be any suitable motor such as an Onan 24 hp gasoline motor. A battery 32 is operatively connected to the motor and the motor controls by means well known in the art. The controls to operate the motor 31 are positioned and located at the side of the apparatus. These controls include a key switch 96, throttle 97 and choke 98. The battery is similarly mounted and carried by the front cross-piece member 11g.

Figure 2:
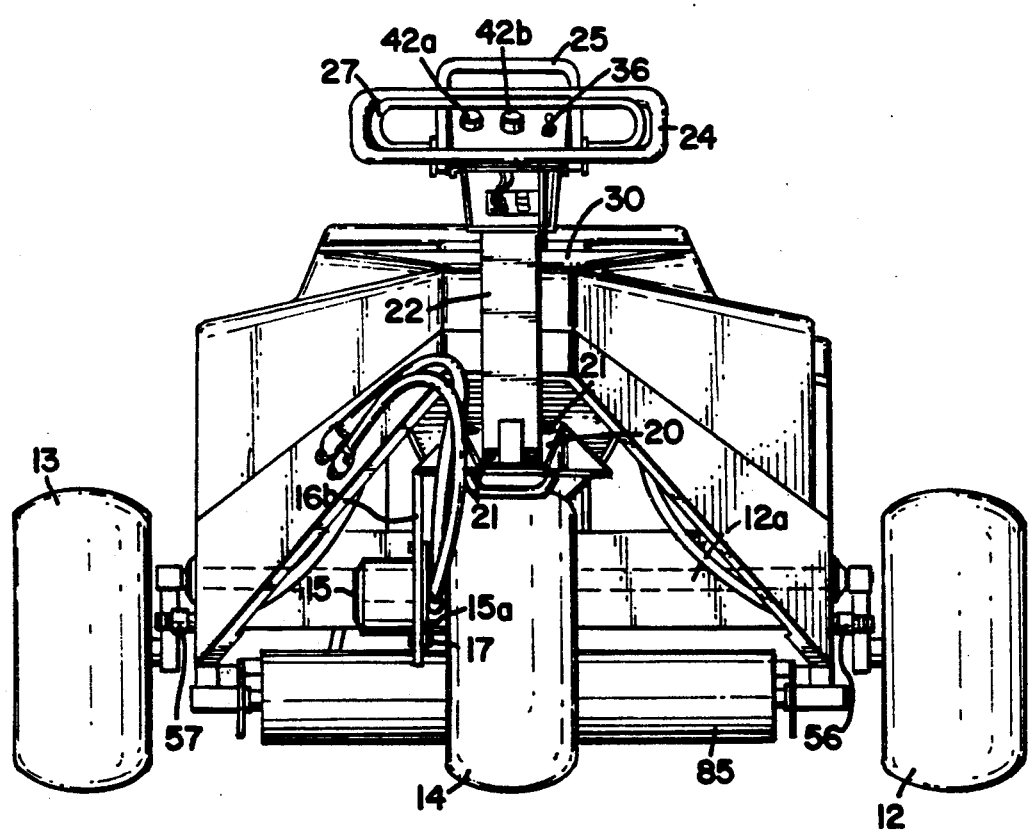
FIG. 2 is a front elevation view of the cultivator shown in FIG. 1.
Figure 3:
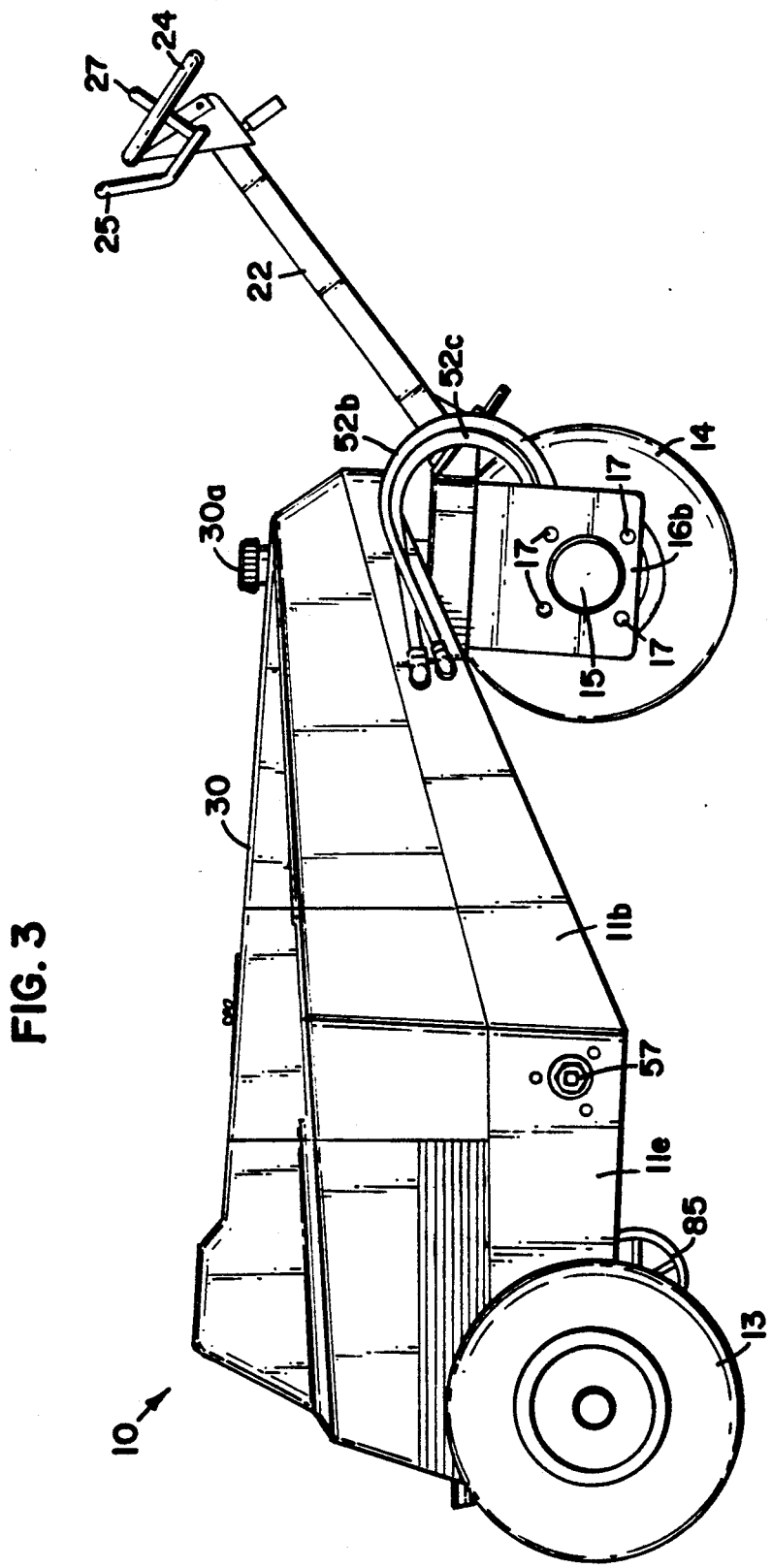
FIG. 3 is a right elevational view of the cultivator shown in FIG. 1.
Figure 4:
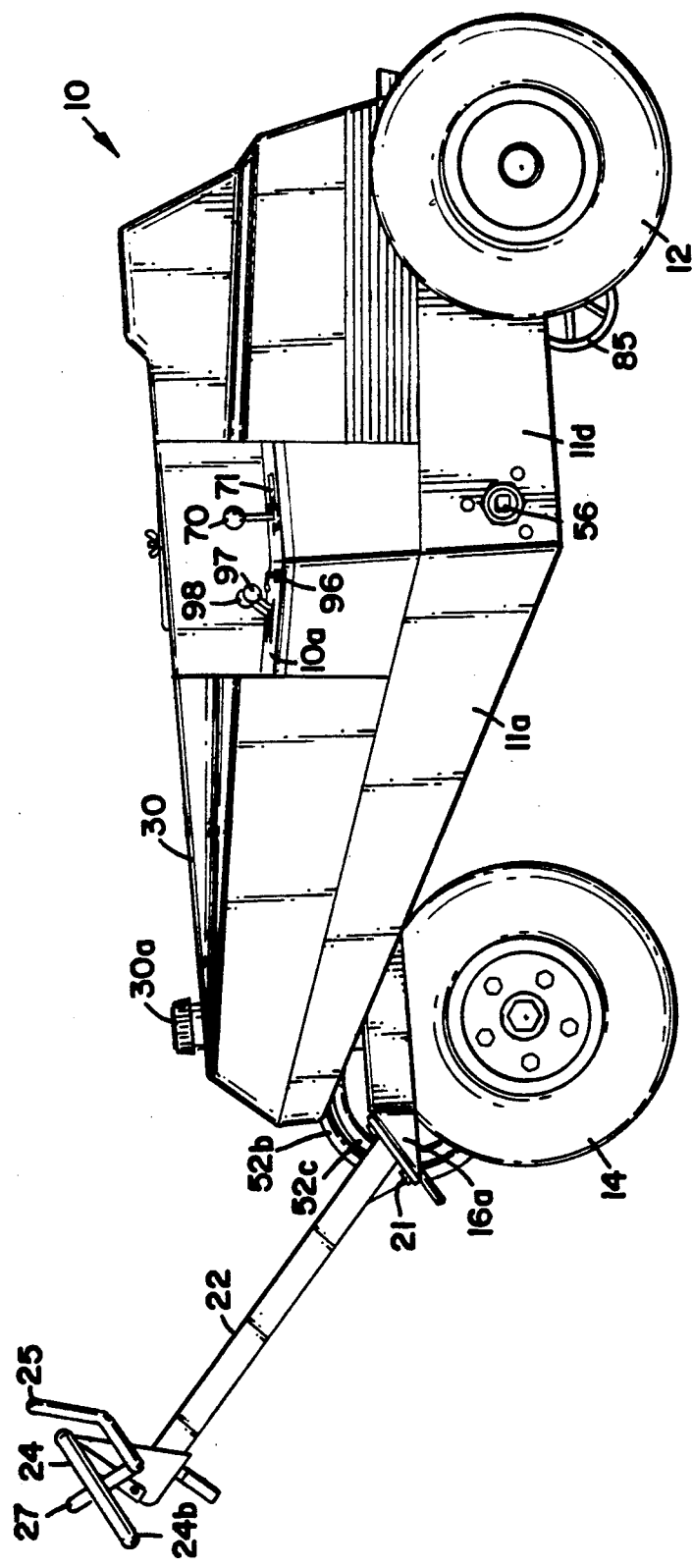
FIG. 4 is a left side elevational view of the cultivator shown in FIG. 1.
Figure 13:
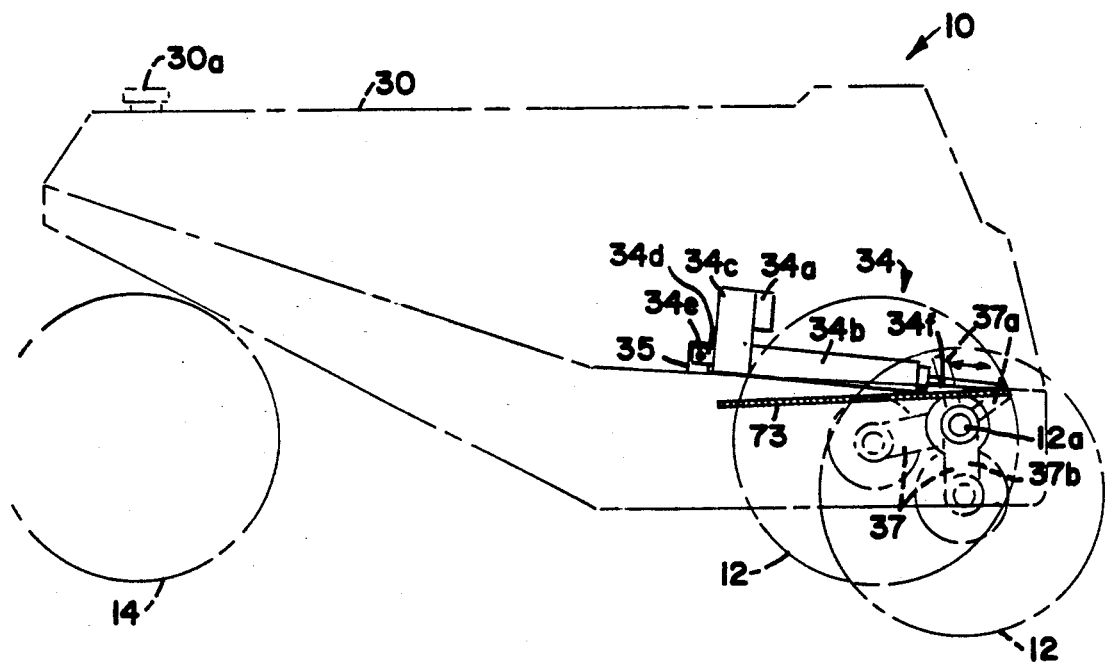
FIG. 13 is a left side elevational view of the cultivator shown in FIG. 1 with portions thereof being shown in phantom to more clearly show the lifting mechanism.

The rear end of the frame 11 is always carried by the rear wheel 14. The front end of the frame 11 may be carried by either the front wheels 12 and 13 (if in a transport mode) or by a roller assembly 33 (when in a cultivating mode). Referring to FIGS. 2 and 13, wherein the lifting mechanism is shown in more detail, it can be seen that the axle 12a is operatively mounted in the frame sides 11d and 11e. In the present embodiment, only one lifting mechanism is utilized for the left front wheel 12, although it is understood that the lifting mechanism is also for the right front wheel or a lifting mechanism for both wheels. The lifting mechanism 34 includes an electric motor 34a which is operatively connected to linear actuator 34b by means of a gear train 34c. A mounting bracket 35 is operatively connected to the left front side 11d by appropriate means such as welding. A mounting flange 34d, which is operatively connected to the gear train 34c, is positioned in the mounting bracket 35 and secured thereto by means of a bolt 34e. The linear actuator 34b has a screw rod 34f which moves in a linear direction as noted by the arrows in FIG. 13 depending upon the actuation of the motor 34a by control 36. The control 36 is a toggle switch which has a neutral position, a lift position and a lowering position. Pivoting lift lever 37 has a pivot point which pivots around the axle 12a. The pivoting lift lever 37 has a first leg 37a operatively connected to a second leg 37b. The angle between the first leg 37a and second leg 37b remains constant. As shown in FIG. 13, the wheel 12 is in its fully down (or transport) position and the rod 34f is retracted. When the screw rod 34f is extended, the first leg 37a moves away from the linear actuator 34b as it follows the screw rod 34f. Such a movement will cause the second leg 37b to also rotate clockwise, thereby rotating the wheels 12 and 13 in a clockwise direction. This results in the lowering of the front end of the frame 11 closer to the ground and as the wheels 12 and 13 continue to rotate the frame 11 will continue to go downward, closer to the ground, until the roller assembly 33 stops further downward movement. The torsion axle 12a extends through frame 11 mounting both tires 12 and 13. Therefore, when tire 12 is rotated up or down, tire 13 also moves up or down.

Figure 10:
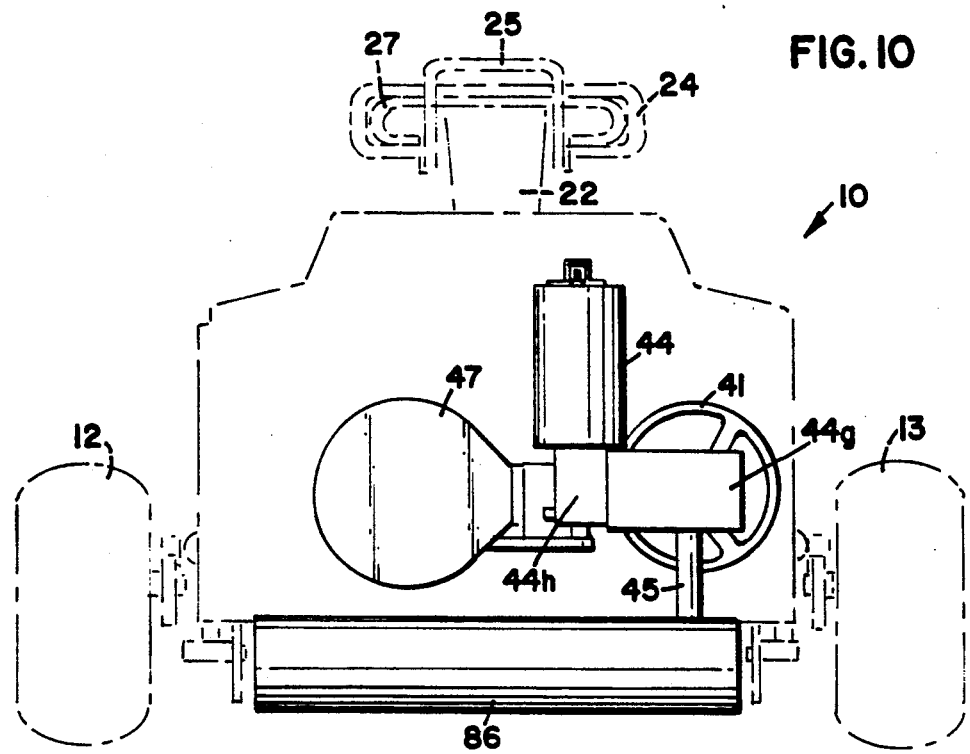
FIG. 10 is a front elevational view of the cultivator shown in FIG. 1 with portions thereof shown in phantom and some of the inner components thereby being visible.
Figure 11:
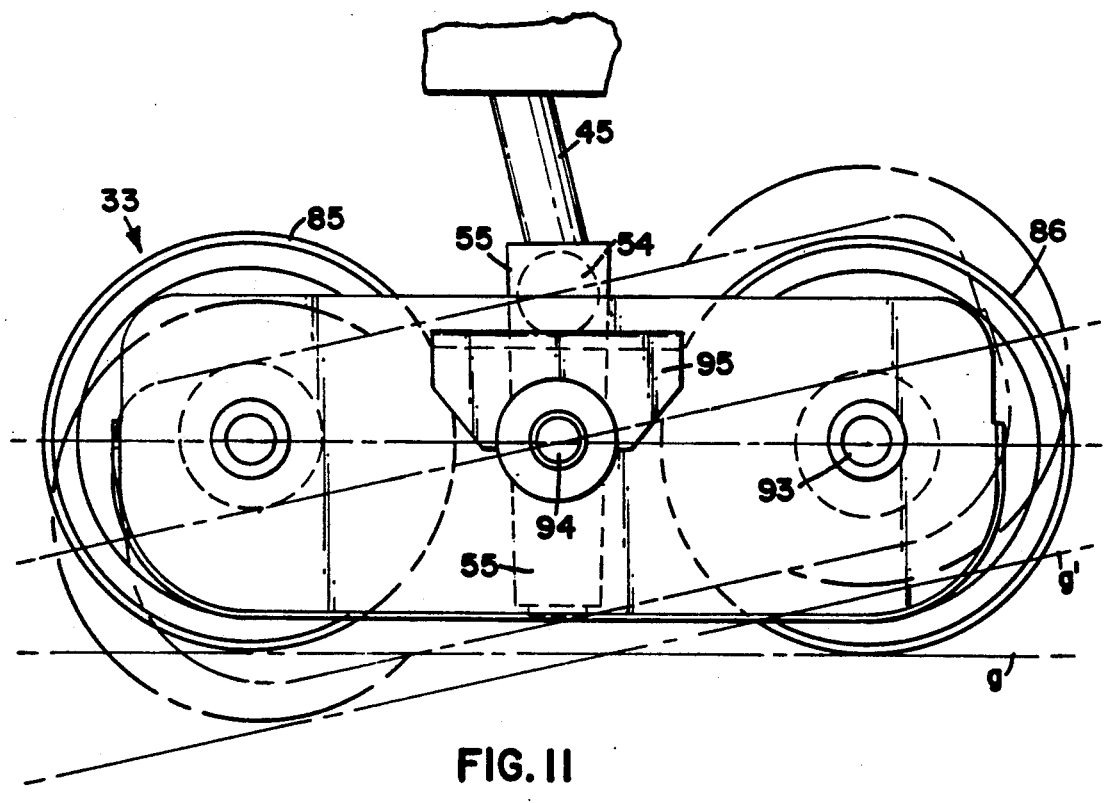
FIG. 11 is an enlarged side elevational view of the rollers and nozzles of the cultivator shown in FIG. 1.
Figure 12:
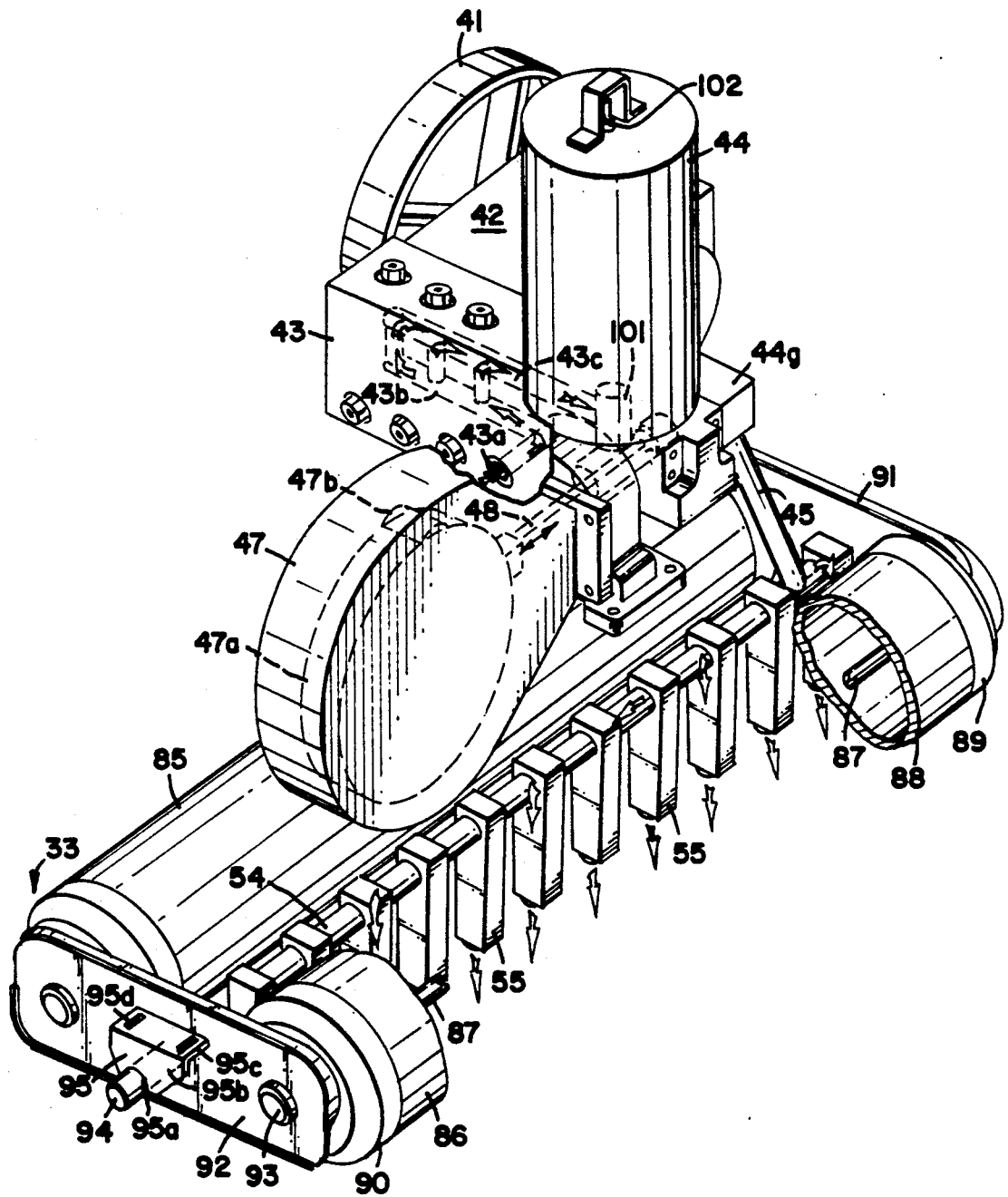
FIG. 12 is a perspective view of a portion of the water system of the cultivator shown in FIG. 1.

Referring to FIGS. 10, 11 and 12, the roller assembly 33 includes a first roller 85 and a second roller 86. The rollers 85 and 86 are generally parallel to each other and have a diameter of approximately 6 inches. The center-lines of the rollers are mounted at a distance of approximately 10 inches, thereby leaving a space between the rollers, at their closest point, of approximately 4 inches.

The rollers 85 and 86 are identical and accordingly only the roller 86 will be described in more detail, understanding that roller 85 is equivalent. The roller 86 has a central shaft 87 on which the roller 86 rotates. The roller 86 is hollow and has an outer surface 88 of steel. It is of course understood that the roller may be formed also of a solid material. Further, it is understood that a roller may be any surface which engages the ground, whether continually or intermittently, as well as a single unit or a plurality of units, such as a plurality of wheels with spaces between adjacent wheels. End caps 89 and 90 are operatively connected to the outer surface 88 at each end. The assembly 33 also includes a first mounting plate 91 and a second mounting plate 92. The rollers 85 and 86 are rotatably mounted between the two plates 91 and 92. The rollers are mounted so that they rotate around their central shaft. The central shaft 87 is rotatably mounted in the side plate 91 and 92 by a method which also allows the rollers to pivot. A bolt 93 is utilized to connect a bearing (not shown) in the side plates 91 and 92. The central shaft 87 is then rotatably mounted in the bearing. Such construction is well known in the art.

A shaft 94 is operatively connected to the side plate 92 by appropriate means such as welding. The shaft 94 is mounted for rotational movement in a connector plate 95 through a bore 95a which is formed in the connector plate 95. The connector plate 95 has an upright section 95b which is operatively connected to a horizontal section 95c. Mounting holes 95d are formed in the section 95c. The connector plate 95 is then mounted to the frame 11d by appropriate means such as bolts. Similarly, a comparable shaft and bracket are mounted to mounting plate 95 which is in turn mounted to the left rear side 11e.

FIG. 11 shows the roller assembly 33 going over a level ground g. In phantom, the assembly 33 is then shown going over an undulating ground g'. The undulating ground g' is shown as both being raised in the front and lowered in the back. This is typically an exaggeration of what would actually occur as the apparatus 10 is going across a green or other turf. Typically, one or other of the rollers would rise to go over an undulation and the other roller would stay on the same plane. However, for purposes of illustration of how the roller assembly 33 works, it is being shown that both the trailing roller 85 is lowered and the forward roller 86 is raised. As can be seen, the assembly 33 rotates about the shaft 94, causing the assembly 33 to rotate but the frame 11, which is attached to the bracket 95, remains relatively level. The roller assembly 33 provides for making the turf, after treatment, a smooth, generally flat surface. Further, due to the tendency of the turf to be lifted during treatment, the failure to roll may enable the wheels, either 12, 13 or 14 depending on the direction of travel, to mark the turf with an indentation after the wheels roll over the turf after treatment. By utilizing roller assembly 33, the indentation problem is avoided.

Referring to FIGS. 8, 9, 10 and 12, the output shaft of the motor 31 is operatively connected to a clutch 38. A pulley 39 is also operatively connected to the output shaft of the motor 31 and is engaged or disengaged by the clutch 38. A belt 40 engages both the first pulley 39 and a second pulley 41. The second pulley 41 is mounted on the drive shaft of the water pump 42 which includes a three valve chamber 43 having an inlet 43a. A gas pressured accumulator 44 is in fluid communication with the outlet port of the three valve chamber 43.

The water pump 42 with three valve chamber 43 and the accumulator 44 may be any suitable pump and accumulator such as a Hawk HC600 pump from Hotsy Corp. of Colorado Springs or pump T4031 from General Pump Company and a 4 inch I.D. nitrogen charged Accumulator A4J005C149J from Parker Hannifin Corp. of Hillsborgh, N.C. The present system is designed to operate at approximately 5,000 psi. Applicants have found that it is preferable to precharge the accumulator to greater than 2,200 psi, and preferably between 2,400 to 2,600 psi. A valve 48 is designed for a reciprocal motion to open and shut the flow to an exit tube 99 and therefore the flow to the discharge tube 45. As seen in FIG. 9, the output shaft of the motor 31 is also operatively connected to a clutch 46 which is in turn operatively connected to a cam box 47. The output shaft of the motor 31 runs at approximately 3,200 rpm. The cam box 47 has a 10:1 reduction gear incorporated thereby having the cam within the cam box travel at approximately 320 rpm. The cam is designed to engage the valve 48 for reciprocal movement, thereby opening and closing the flow through the exit tube 99 and the discharge tube 45. The water pump controls are mounted on the support bracket 23 and include a start button 42a and a stop button 42b.

Figure 18:
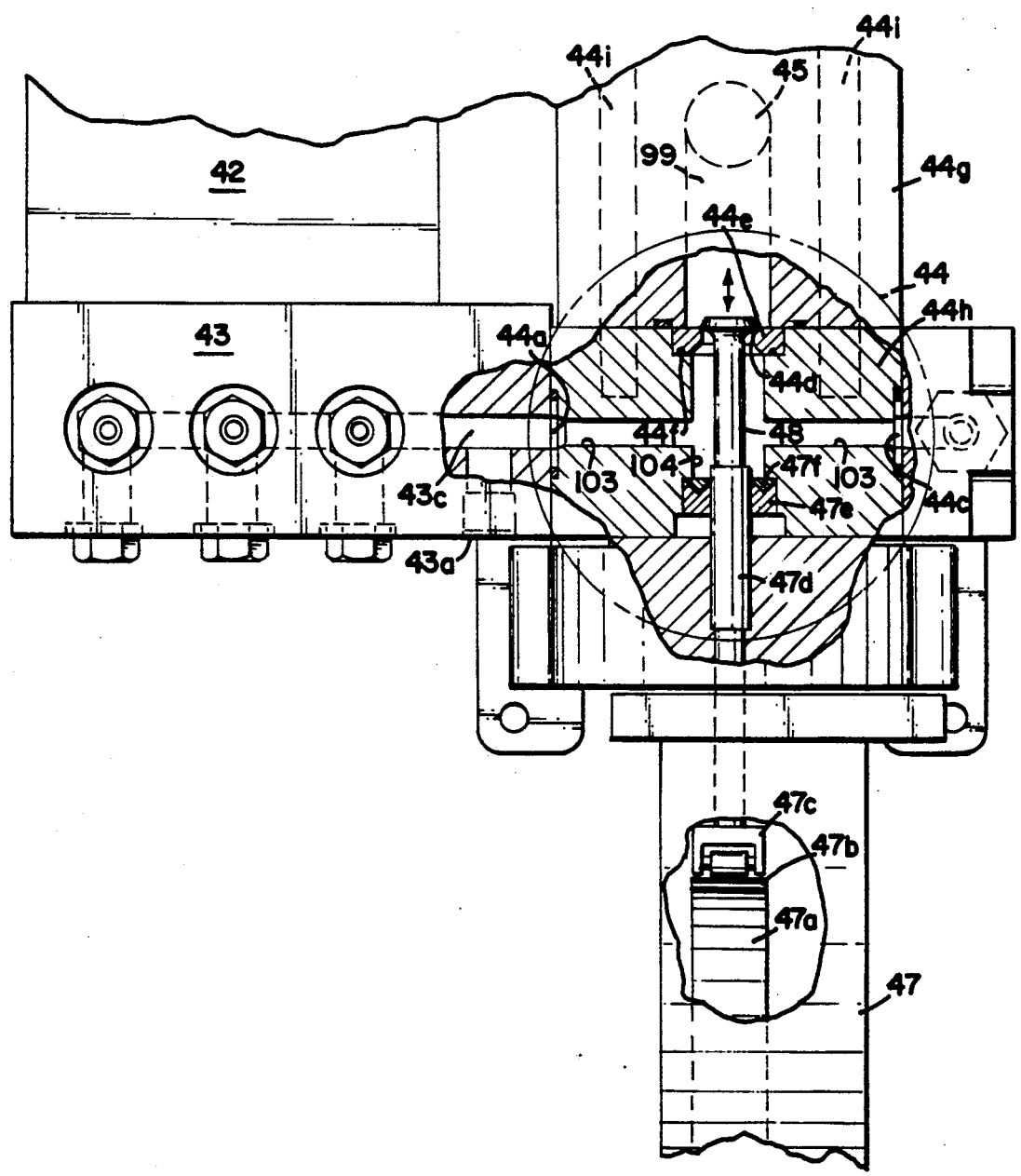
FIG. 18 is a cross-sectional view of a portion of the pressured water assembly of the cultivator shown in FIG. 1.

Referring to FIGS. 12 and 18, it can be seen that the three valve chamber 43 has an inlet 43a in which the water will flow. The water, or other incompressible liquid, will flow through channel 43b at which time it will be pumped through the three valves and go out under pressure through outlet channel 43c. The water flows through an inlet port 44a of the valve 44h. An O-ring 44b may be utilized to seal the inlet. The valve 44h has a first passageway 103 which is in fluid communication with the outlet channel 43c. A second passageway 104 is also in fluid communication with passageway 103 and is generally perpendicular thereto. The water, which is flowing under pressure out of the valve chamber 43 then enters the input 101 of accumulator 44 and the accumulator increases in pressure to a preset pressure. As shown in FIG. 12, the input 101 (shown in dashed lines) and is in fluid communication with a reservoir (not shown) above the input. As previously indicated if the preset pressure is 5,000 psi, the accumulator 44 has been precharged through an inlet 102 to approximately 2,200 to 2500 psi. The water then continues to enter the reservoir of the accumulator 44 through the input 101 until the preset pressure has been reached. At that time, any excess flow is discharged out a relief valve which is connected to the relief port 44c of the passage 103. The input 101 of the accumulator is positioned above passageways 102 and 103 and is in fluid communication with both. The discharge port 44d of the valve 44h has a stainless steel valve seat 44e and O-ring 44f is operatively mounted in the valve seat 44e. The valve seat 44e is slightly smaller than the opening in which it is positioned in the valve 44h. The outside diameter of the valve seat 44e is approximately 0.006 inches smaller than the diameter of the opening in the valve 44h. The valve seat 44e has a central opening which defines the area of the outlet port 44d for pressurized water to pass.

A valve stem 48 is reciprocated by means of the gear box 47. Inside of the gear box 47 is a cam 47a which is being driven by a 10:1 gear reduction gear which is attached to the output shaft of the motor 31. The cam 47a has a protrusion 47b of 0.10 inch. This protrusion is what acts on the cam follower 47c, causing the cam follower 47c to move 0.10 inch. The length of the protrusion is designed to allow the valve 48 to be unseated for the desired time. The valve stem 48 is positioned adjacent the cam follower 47c such that the cam follower's motion is transferred to the valve stem 48. A return spring (not shown) is utilized to initially close the valve until pressure is developed, at which time the pressure keeps the valve closed. A ceramic guide 47d, brass head ring 47e and valve packing 47f are positioned to guide the valve stem 48. The high pressure water will push more on the ceramic guide 47d than the head of the valve stem 48, thereby biasing the valve stem 48 in a closed position. The valve stem 48 has a head 48a which is slightly (approximately 0.060 inch) larger than the outlet port 44d. Therefore, when the valve stem is in the position shown in FIG. 18, flow of water out of the accumulator into a exit tube 99 is precluded. When opened, water would flow out to the exit tube 99 and then to the discharge tube 45. A manifold inlet flange 44g is connected to the valve 44h by means of four bolts (not shown). The bolts are secured through holes 44i. The clearance between the valve seat 44e and the valve 44h allows the valve seat 44e to "float". While this clearance has previously been described as approximately 0.006 inches it is understood that other suitable clearances may be utilized and still have clearance to enable the seat to move slightly or "float" during assembly. The O-ring 44f will provide the seal for the passageway. The floating valve seat 44e will allow the valve seat to be aligned concentrically with the valve stem 48. In assembling the valve stem and valve seat, the two components are centered and then the bolts are inserted into the bores 44i and tightened, producing clamp interference of 0.001 inch to 0.007 inch between seat 44e and flange 44g. This allows the valve seat 44e and stem 48 to be concentric and thereby form a better seal.

A pulley 49 is also operatively connected to the output shaft of the motor 31 and a belt 50 engages the pulley 49 and a pulley 51. There is no clutch associated with this and the pulleys 49 and 51 are constantly being driven. The pulley 51 is rotatably mounted on a shaft 52a of a hydrostatic pump 52 such as a variable displacement axial pump BDP-IOL from Sunstrand of Ames, Iowa. The oil in the gear box 47 also acts as a source of oil for the pump 52. An inlet tube 53 allows oil to flow from the gear box 47 to the pump 52. The pump may be of any type well known in the art such as a positive displacement variable volume piston pump. Depending upon the direction which the pump lever of the pump 52 is moved, oil will flow out of either lines 52b or 52c to the hydraulic drive motor 15, thereby driving the motor 15 either in forward or reverse.

The discharge tube 45 is preferably of metal and is of sufficient structural strength to support a nozzle bar 54. The bar 54 may also be supported at other points along its length, if necessary. A plurality of nozzles 55 are in fluid communication with the nozzle bar 54. As shown in FIG. 12, there are 11 nozzles 55 spaced apart along the nozzle bar 54. The nozzles and spacing will be more fully discussed hereafter. While the spacing of the nozzles 55 controls the spacing of the cultivation holes in a transverse direction, the ground speed of the apparatus as well as the frequency at which the valve 48 allows water to the discharge tube 45 controls the spacing in the other direction. Since the speed of the motor 31 is constant and the valve 48 is thereby reciprocated at a constant speed, the spacing of the holes as the apparatus moves across the turf, in the direction of travel, it is controlled by the speed of the apparatus. This is determined at the rate which the hydrostatic pump 52 is operated.

The control linkage 64 is shown in detail in FIGS. 15-17. The linkage assembly 64 is mounted to a plate 65 which is in turn operatively connected to the frame 11. The plate 65 is generally perpendicular to the frame 11. Two standoffs 66 are mounted generally perpendicular to the plate 65. Two support arms 67 and 68 are pivotally mounted on the standoffs 66 for rotational movements at their first ends 67a and 68a. The second ends 67b and 68b of the support arms 67 and 68 are secured to a generally rectangular bracket 69. A lever 70 is mounted by appropriate means such as bolts to the support arm 67. The lever 70 extends through a slot 71 in the outer body 10a of the apparatus 10. A bushing 72 is welded or operatively connected by other appropriate methods to the bracket 69 and is carried thereby. The bushing 72 has a bore through which a rod 76 slides. Attached to the one end of the rod 76 is a washer 74 and a pin 75 protrudes therefrom. This prevents the rods 76 from sliding through the bushing 72. Attached to the other end of the rod 76, away from the pin, is a cable 73. Also attached to the rod 76 by appropriate means such as welding, is a stop plate 77. Another standoff 78 is mounted to the plate 65. Pivotally mounted thereto is a bar 79 having a roller 80 at a first end and a roller 81 at a second end. The cable 73 is attached to the first let 37a of the lever 37. When in the transport mode, the cable 73 is loose and tension is not on the cable 73 so that the rod 76 may move back to the position shown in phantom in FIG. 15. Since the stop plate 77 is carried by the rod 76, it also would be in the position shown in phantom in FIG. 15. When in the cultivating mode, the cable 73 is tight, thereby bringing the pin 75 up against the bushing 72 and the plate 77 to the position shown in solid line in FIG. 15.

Cable 29 which is connected to the traction control bar 27 has a threaded end to which two nuts 82 are secured. Positioned between the two nuts 82 is a bar 83 which in turn is operatively connected to a pump control arm 84. The first end 84a of the pump control arm 84 is rigidly connected to the bar 79. It can thereby be seen that any longitudinal movement of the cable 29 is transferred via the bar 83 to a transverse motion and the pump control arm 84. The second end 84b of the bar 84 is operatively connected to the pump level of the hydrostatic pump 52 so that movement of the arm 84 in a first direction will cause the motor 15 to go in a first direction and movement in the opposite direction will cause the motor to go in the opposite direction. The linkage assembly 64 provides for preset limits to the distance which the arm 84 can be actuated and hence the ultimate speed of the apparatus 10.

FIG. 15 illustrates the pump 52 being in a neutral position. This is when the bar 79 is generally vertical. In order to obtain movement from the pump 52, it is necessary for the bar 79 to be pivoted as shown in FIG. 17. When it is pivoted in a first direction, the bar rotates counterclockwise and when in a second direction it rotates clockwise, as shown in FIG. 17. In both instances, the stop plate 77 limits further rotation of the bar 79. The limitation is both the same in the forward and reverse direction. Accordingly the apparatus, when the stop plate 77 is in position, effectively allows the apparatus to go the same speed in the forward and reverse direction. When in the transport mode, the cable 73 is slack, thereby allowing the stop plate 77 to move up against the bushing 79 and thereby allows further rotation of the bar 79 and therefore greater speed from the pump 52. The governed speed to which the motor is set is determined by the distance that the lever 70 is moved forward or backward. By moving the lever 70, rotation around the standoffs 66 occurs. This creates movement of the bracket 69 and therefore the bushing 69 and stop plate 77. By causing movement of the bracket 69 about two pivot points 66, the stop plate 77 is always perpendicular as viewed in FIG. 15. While the linkage could be positioned in a different orientation so that the stop plate 77 would not be vertical, it would always be in a position such that when the bar 79 is in a neutral position, the distance from the stop plate 77 to roller 80 is equal to the distance from the stop plate 77 to roller 81. This assures that the governed speed forward is always the same as the governed speed in reverse. A second slot 71a is formed in the outer body 10a and is parallel to slot 71. A fastener 71b has a first end which engages and slides with lever 70 and a second end which slides in slot 71a. Calibration marks may be placed on the edge of slot 71a which correspond to hole spacing in the direction of travel of the apparatus 10, thereby easily allowing the operator to adjust the hole spacing. A suitable fastener may be incorporated to lock the fastener 71b and thereby the lever 70 in position.

Referring to FIG. 19, the valve stem 48 is shown in a closed position and in the open position in phantom. The discharge tube 45 is in fluid communication with the nozzle bar 54. The nozzle bar 54 (or manifold) has a longitudinal bore 54a that extends throughout its length. The nozzles 55 are all in fluid communication with the bore 54a. The nozzle 55 has a longitudinal bore 55a which is in fluid communication with the bore 54a. The nozzle bores 55a then taper further to an output port 55b which is in fluid communication with the bore 55a.

The nozzle bar 54, as shown in FIGS. 12 and 19a is constructed from discreet segments of pipe which are welded between the nozzles 55. The nozzles 55 also have an inner bore which aligns with the bore 54a in each one of the pipe sections. Collectively the bores in the pipe segments and the inner bores of the nozzles are referred to as the bore 54a. It is also appreciated that it would be possible to have a single continuous length of tubing and have threaded nozzles ports wherein drop nozzles may be threaded into and engage the nozzle bar which is one continuous bar. Other modifications or adaptions of this construction may also be utilized.

The valve stem 48 is unseated by motion of the cam 47 and protrusion 47b. During the initial portions of the opening of the valve stem 48, the opening is necessarily smaller than when the valve stem is in its fully extended position. Similarly, the opening is closed over a short period of time but not instantaneously. Accordingly, the flow of water into the exit tube 99, if graphed, would look somewhat like a sine wave, which would be similar to the cam profile. Ideally, in order to obtain the most effective penetration of the liquid into the turf, a flow in the shape of a square wave is preferable. Applicants have found that they have been able to utilize the "water hammer effect" in helping to achieve this goal. The initial impact of a free stream of water produces a water hammer, and a resultant high pressure. By utilizing this initial water hammer effect, the flow of water through the nozzle output ports is able to be more in the order of a square wave and thus provide for more efficient transfer of energy and thus a deeper hole into the turf. Applicants have found that by the proper sizing of various components of the flow distribution system, the water hammer effect may be beneficially utilized. However, there is the danger that the water hammer effect may be so great that it will tear apart the liquid distribution system.

In viewing FIG. 19, it can be seen that the bore 54a has a cross-sectional area ($A_B$). Further, the nozzle output ports 55b have a nozzle area ($A_O$) which when multiplied by the number of nozzles (n) equals the accumulated area of the output ports ($A_N$). For a given number of nozzles; system pressure (p) in pounds per square inch; and area of the nozzles, it is possible to calculate what is the optimal cross-sectional area of the nozzle bar bore 54a. This is given by the formula $A_B = (K)(n)(A_o)\sqrt{P}$ or $A_B = (K)(A_n)\sqrt{P}$.

Applicants have found that if the constant is above 1.4, the system is too soft and adequate penetration into the turf is not realized. Further, if the constant is below 0.2, the water hammer effect becomes too destructive to the manifold.

For a pressure of 5,000 psi and 11 nozzles having a diameter of 0.0595 inch and a bore 54a having a diameter of 1 inch, it is found that the constant equals 0.357. While Applicants have found that the range of 0.2–1.4 is preferable for the range of the constant, a more preferable range is from 0.2 to 0.5.

A left side hose connector 56 is mounted in the left front side 11d and a right side hose connector 57 is mounted in the right side 11e. Hoses 58 and 59 are connected at their first ends to the hose connectors 56 and 57 respectively and at their second ends to a connector 60. A water strainer 61 is placed in fluid communication with the connector 60 by means of hose 62. The inlet of the water pump 42 is then placed in fluid communication with the strainer 61 by means of hose 63.

Figure 5:
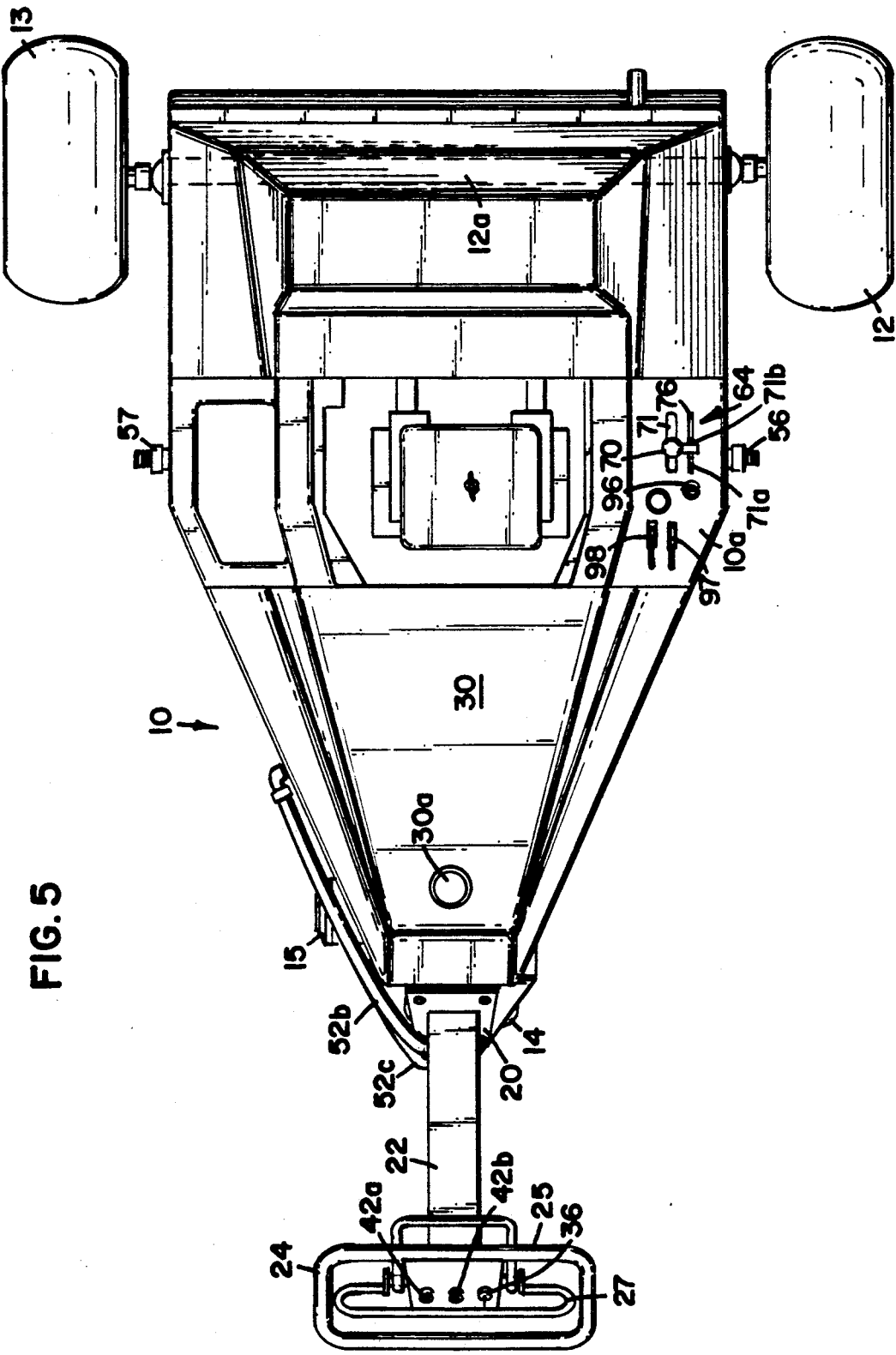
FIG. 5 is a top plan view of the cultivator shown in FIG. 1.
Figure 6:
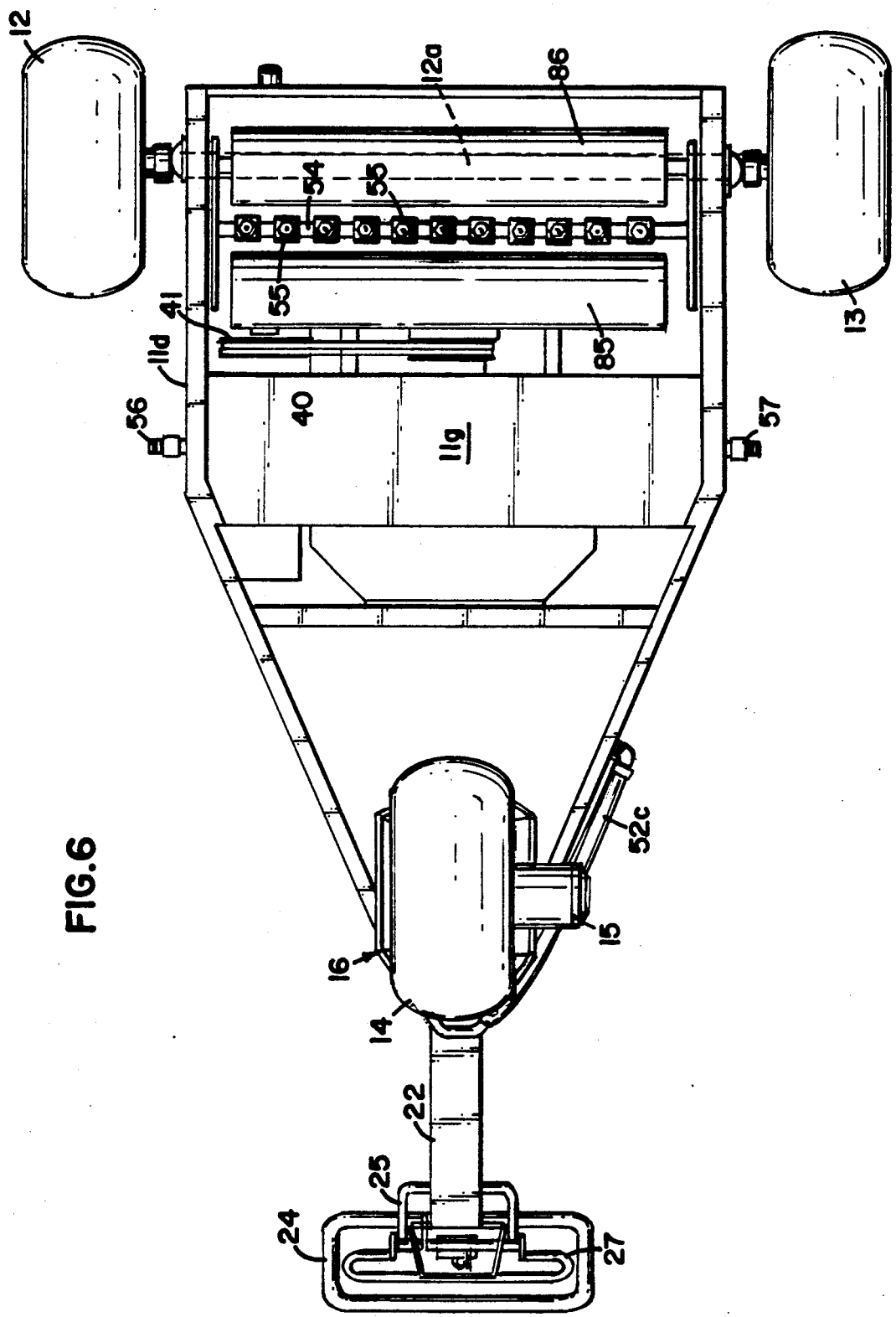
FIG. 6 is a bottom plan view of the cultivator shown in FIG. 1.
Figure 7:
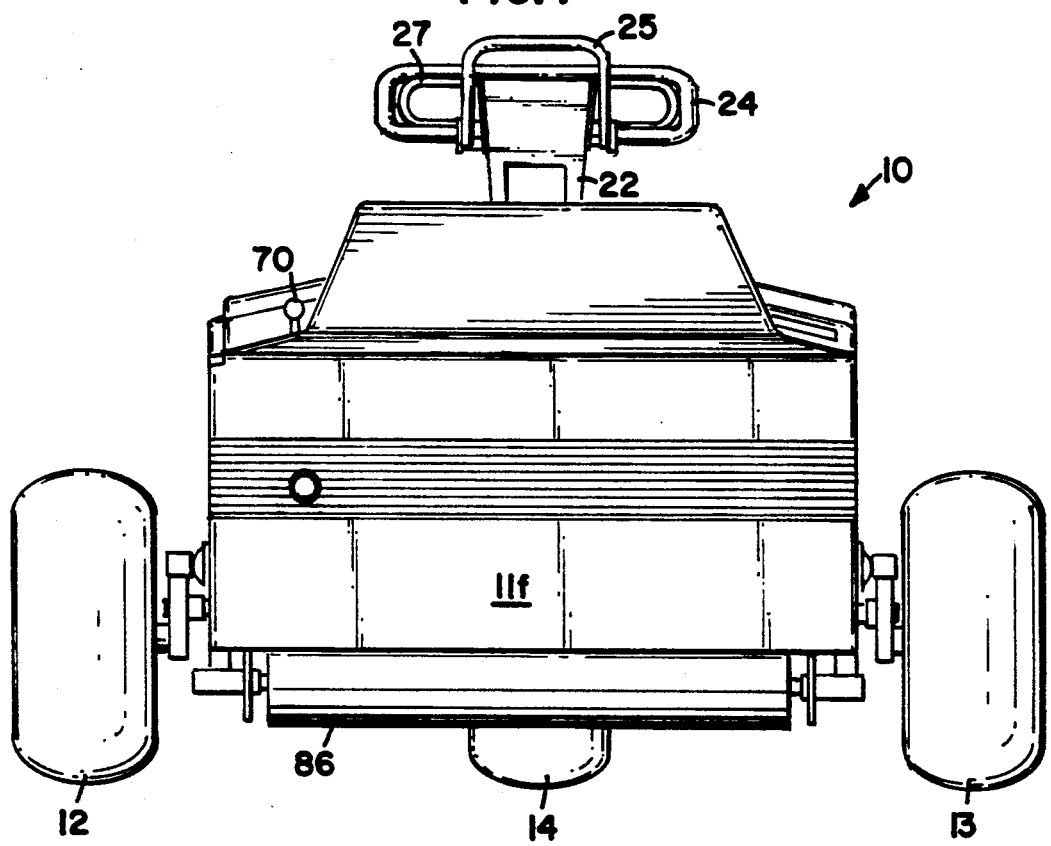
FIG. 7 is a rear elevational view of the cultivator shown in FIG. 1.

In operation, the motor 31 of the apparatus 10 is started from controls (key switch 96, throttle 97 and choke 98) which are located on the panel 10a. Such controls are shown in FIG. 5 as it is well known in the art how to design such controls. It has been found that it is preferable to have an aerate start 42a and aerate stop button 42b on the support bracket 23 as well as the toggle switch 36 for raising and lowering the front wheels. By locating the controls in such a position, it is possible for an operator to operate the apparatus 10 from one position. When the motor 31 is engaged, the hydrostatic pump 52 is driven by means of the pulleys 49 and 51 and belt 50. The pump 52 is always driven as there is no clutch associated with the pump 52. If the pump 52 is stroked in a first direction, the oil will flow out of the first line 52b to the hydraulic drive motor 15, causing the apparatus to go in a first direction. If the pump 52 is stroked in the other direction, oil will flow out of the second line 52c to the hydraulic motor 15 and be driven in the opposite direction. When the wheels 12 and 13 are in an up (or cultivating) position, the speed at which the motor 15 can be driven is determined by the linkage assembly 64. As previously discussed, when the wheels 12 and 13 are in a transport position, the linkage 64 allows the motor 15 to be driven at a faster or transporting speed. Then, when the wheels are again raised for cultivation at the next location, the linkage comes back into effect and the speed is limited to the cultivating speed. With the present apparatus, it has been found that travelling at approximately one to two miles per hour will provide cultivating holes at approximately 3 to 6 inch intervals respectively. This can of course be increased or decreased depending upon the speed of the apparatus 10 as it traverses the turf, either a golf green or other turf. By the linkage assembly 64 controlling the speed of the apparatus 10 to the same in both the forward and reverse direction, it is possible to walk the apparatus 10 back and forth across the turf and still maintain the same hole spacing because the speed is kept the same in both directions by the linkage assembly 64. It therefore is not necessary for the apparatus to be continually run in one direction, but may be utilized in a first direction and then angling the apparatus slightly to one side for a short distance and then reversing the direction to go parallel across the turf in an opposite direction.

Water may be supplied through either connector 56 or 57. The supply of water may be from a tank or other source water such as an underground sprinkling system. Any suitable controls may be utilized to actuate the water pump and gear box 47. The clutches 38 and 46 may be controlled by any suitable mechanism. It has been found that it is advantageous to have the clutches 38 and 46 controlled through an electronic timer system which requires that the machine move after engagement, that the water system incoming water have pressure, and that the lift mechanism has the tires 12 and 13 off of the ground or in other words, the roller assembly 33 on the ground before it will start up the system to allow the system to pressurize. There is therefore the ability to have a safety interlock and pressurize the water before it starts injecting the water and if the water hose gets kinked or if the operator starts putting the tires to the ground and lifting the rollers up or if the travel of the apparatus is stopped for too long, the pump 43 will be stopped so that the high pressure water will bleed off. An override circuit may be utilized which enables the pump to keep pressurizing water and therefore injecting water even though the apparatus is stopped. This will allow multiple shots to go into the same hole. With such multiple shots depths of up to 5 feet may be obtained. Such increased depths are beneficial in providing drainage in problem areas.

After the water supply has been connected to either connector 56 or 57, the water travels through either hose 58 or 59 to the connector 60 and then through the strainer 61 to the input of the water pump 42. The water is then pressurized and accumulated in the accumulator and released when the valve stem 48 is unseated by motion of the cam. The pressurized water then flows through the exit tube 95 and then the discharge tube 45 and out through the nozzles 55. The roller assembly 33 acts as both rollers to apply mechanical pressure to the turf being cultivated before and after the cultivation. In addition, the roller acts as gauge wheels to keep the nozzles a consistent height off of the top surface of the turf. Still further, the wheels act as a guard to prevent injury to the operator. The rollers prevent access from the front and back of the nozzles and the plates prevent access from the sides. Further, the roller assembly 33 has rollers which are positioned both in front of and behind the nozzles. The roller which is in front of the nozzle is not required for a particular pass with the apparatus 10. However, when the direction of travel is reversed, the front roller now becomes a rear roller. This allows the machine to be bidirectional. Further, having hose connectors 56 and 57 on both sides allows for the apparatus 10 to be bidirectional by not having to move the hose supplying the water from one side to the other when the direction is changed.

It has been found that it is preferable to have pressure of at least 2,300 psi with better results being obtained with a pressure of at least 4,000 and still more preferably of at least about 5,000 psi. It has been found that the exit velocity of the water from the nozzles 55 has shown the best correlation to the ability of the water stream to penetrate the turf. It appears to be difficult to penetrate the top layer of the turf and that the additional velocity which results from at least about 5,000 psi versus 2,300 psi is more significant than what lab testing would indicate. Another critical factor in determining the size and power requirement of the apparatus is the duration of the shot. The flow requirement and thus power required is a linear function of the shot time. If the time of release of the pressurized fluid can be reduced, while still maintaining depth of penetration of the slug of water, the overall power requirements for the apparatus 10 can be reduced. It has been found that a shot time of from about 0.007 to about 0.020 second and preferably from about 0.010 to about 0.015 second is preferable. Penetration of the water slug is able to be maintained with this reduced shot time.

The nozzles 55 have an inlet port 55c and an outlet port 55b. The outlet port may be sized depending upon the amount of water flowing through the system as well as the depth of penetration desired. One example of the present invention with nine nozzles having a diameter of 0.067 inch is shown as follows:

EXAMPLE I

| | With 9 - 0.067" diameter nozzles | | | | |
|---|---|---|---|---|---|
| Time (sec.) | Pump | Accumulator | Relief Valve | Nozzles | |
| 0–.010 | 4.00 | 64.17 | 0 | 68.17 | flow (gpm) |
| | .154 | 2.471 | 0 | 2.625 | vol. (in$^3$) |
| .010–.170 | 4.000 | (4.000) | 0 | 0 | (gpm) |
| | 2.471 | (2.471) | | | (in$^3$) |
| .170–.188 | 4.000 | 0 | 4.000 | 0 | (gpm) |
| | .270 | 0 | .270 | 0 | (in$^3$) |
| Gal/NET Min | 4.000 | 0 | .364 | 3.636 | |

The Example I describes one cycle of the cam in 0.188 second. The shot time is 0.010 second. During this time, the valve 48 is away from the seat 44e and water is flowing through the outlet port 44d. The pump 42 is pumping at four gallons per minute, the accumulator is discharging at 64.17 gallons per minute and the nozzles a combined total of 68.17 gallons. Then, from 0.10 to 0.170 second, the pump continues to pump at four gallons per minute and the accumulator is building up at a flow rate of four gallons per minute. After this time, the accumulator is pressurized to 5,000 psi as the total volume 2.471 in$^3$ has now been replaced. During the next 0.018 second, the relief valve is opened and the flow rate of four gallons per minute is exiting the relief valve.

As previously indicated, the nozzles 55 all have outlet ports. It has been found that the accumulated area of the outlet ports preferably has a specific relationship to the area of the outlet port 44d of the valve 44h. It has been found that the area of the outlet port 44d is from 6-12 and preferably 8-10 times the total area of the output ports of the nozzles 55.

It is further been found that when the output ports of the nozzles 55 are positioned from up to about 5 inches above the top surface of the soil of the turf and preferably from about ½ to about ¾ inch above the top of the turf, better cultivation and aerification result. Applicants have found that nozzles outlet ports preferably have a diameter of from about 0.030 to 0.090 inch.

The nozzles 55 may be spaced apart along the bar 54 at appropriate intervals. It has been found to most effectively reduce the general turf density is to maintain certain spacings between the jets of water and therefore between the nozzles 55. It has been found that at least about a six inch by six inch square pattern is desired to reduce the turf density with spacings down to about three inches by about three inches being preferable. The type of turf being cultivated will of course affect the spacing which is desired. The lateral spacing of the nozzles is controlled by the number of nozzles placed on the bar 54, whereas the placement of the holes in the perpendicular direction to the nozzle bar 54 is determined by the speed at which the apparatus 10 moves and the speed at which the valve 48 allows water to be discharged. At two miles per hour with motor 31 rotating 3,200 rpm and a 10:1 gear reduction so that the valve operates 320 times per minute a hole spacing of every six inches is obtained. Decreasing the speed to one mile per hour would reduce the spacing to three inches. When the nozzles 55 are at spacings as previously discussed, the water will penetrate the turf in a first direction and go into the turf creating a cultivation hole. At the same time, the water is dispersed in a direction generally outward from the first direction of penetration sufficient to fracture, lift and separate the soil so as to reduce the general soil and turf density. By periodically injecting, from above the turf to be treated, relatively small cross-section spaced jets of generally incompressible liquid into the turf at a pressure sufficient to cause a lateral dispersion of the liquid within the turf and also having jet spacing such that the lateral dispersement from adjacent jets coact with one another the fracture, lift and separate the soil and turf, the general soil and turf density is thereby reduced.

Referring to FIG. 19, there is generally shown the turf and subsoil after cultivation. Three holes 110 are shown through the turf and subsoil. Depending upon the parameters of the pressurized water delivery system, the holes 110 will vary in depth. Applicants have found that a depth to be expected from the system previously described would be approximately 6 to 8 inches. This also of course depends upon the type of soil being cultivated. As the pressurized liquid enters the subsoil, it continues to go downward and Applicants theorize that the water takes the path of least resistance. That is, if a certain portion of the soil is less dense than the another portion, the water travel may not be completely straight. It would tend to be deflected one way or the other based on the density. In addition, the pressurized liquid would tend to go off laterally if it would encounter a rock or stone. In any event, Applicants theorize that the pressurized water flows down the holes 110 but also is dispersed generally laterally in an outward direction as shown by the smaller fissure holes 110a. The lateral fissure holes 110a coact with adjacent holes 110a to fracture, separate and lift the subsoil, thereby cultivating and reducing the density of the subsoil.

The reduction in soil and turf density promotes improved turf growth as well as improved drainage of the turf. This is accomplished with the present method and apparatus by injecting, from above the surface to be treated, relatively small cross-section jets of generally incompressible liquid into the turf. The patterns of the jets of liquid at a jet pressure and a jet spacing are sufficient to provide lateral dispersion of the liquid within the turf such that the liquid dispersion of the adjacent jets coact with one another to fracture, lift and separate the turf.

While the liquid described is referred to as water, it will be understood by those skilled in the art that any substantially incompressible liquid, such as an incompressible liquid fertilizer or weed killer may be used. The important factor is that the liquid have sufficient incompressibility so that the injection pressure and jet spacing provides the turf penetration and lateral dispersion necessary to accomplish the fracturing, lifting and separation of the turf to significantly reduce soil and turf compaction.

While the apparatus has been described with respect to a single row of generally transversely spaced nozzles, it will be understood by those skilled in the art that multiple rows of transversely spaced nozzles may also be employed. By controlling the timing of the slug injection with the speed of the frame movement over the turf to be treated, predetermined sections of turf may be treated during any specific injection sequence.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

We claim:

1. An apparatus for cultivating turf by hydraulic action, comprising:
   (a) a frame;
   (b) means operatively connected to said frame for propelling said apparatus over the turf to be cultivated;
   (c) a plurality of fluid nozzles operatively connected to said frame, each of said nozzles having inlet and outlet ports, each of said nozzle outlet ports having a cross-sectional area and said nozzle outlet ports having a diameter of from about 0.033 to about 0.090 inch;
   (d) means for pressurizing liquid operatively connected to said frame, said nozzles in fluid communication with said pressurizing means, said pressurizing means, having suitable flow on and flow off duration times, providing a flow of liquid from about 2,300 psi to about 5,500 psi;
   (e) means for providing a source of liquid to be in fluid communication with said pressurizing means;
   (f) means for controlling flow of the liquid from said pressurizing means to said inlet ports, whereby the liquid exits said outlet ports at a pressure sufficient to cause the liquid to penetrate the turf and create cultivation holes;
   (g) a manifold having an elongate bore, said manifold having an inlet in fluid communication with said pressurizing means and said nozzles in fluid communication with said bore; and
   (h) the cross-sectional area of the bore is sized in relationship to the pressure and an accumulation of the cross-sectional area of the nozzle outlet ports, wherein a water hammer effect is created which is sufficient to effect the flow of liquid out of the nozzles more in the order of a square wave pulse and the water hammer effect is not enough to destroy the manifold, wherein the relationship of the pressure in pounds per square inch, cross-sectional area of the bore ($A_B$) and the accumulated area of the outlet ports of the nozzles ($A_N$) is given by the following:

$$A_B = (K) A_N \sqrt{P}$$

wherein the constant K is between 0.2 to 1.4.

2. The apparatus of claim 1, wherein K is between 0.2 to 0.5.

3. The apparatus of claim 1, wherein said flow off duration time is about 0.178 second.

4. An apparatus for cultivating turf and soil by hydraulic action, comprising:
   (a) a frame;
   (b) means operatively connected to said frame for propelling said apparatus over the turf and soil to be cultivated;
   (c) a plurality of fluid nozzles operatively connected to said frame, each of said nozzles having input and output ports;
   (d) means for providing pressurizing liquid operatively connected to said frame, said nozzles in fluid communication with said pressurizing means;
   (e) means for providing a source of liquid to be in fluid communication with said pressurizing means;
   (f) means for controlling flow of the liquid from said pressurizing means to said inlet ports, whereby the liquid exits said outlet ports at a pressure sufficient to cause the liquid to penetrate the turf and subsoil and create cultivation holes; and
   (g) means for setting a first speed when said apparatus is in a transport mode and setting a second speed when said apparatus is in a cultivating mode, said setting means comprises:
      (i) a traction control bar operatively connected to and for moving a pump control arm;
      (ii) said pump control arm having a first end operatively connected to a pump and a second end;
      (iii) a stop plate for selective engagement of said second end of said pump control arm; and
      (iv) means for allowing movement of said stop plate between a first position and a second position, said movement allowing means being responsive to changes between the transport mode and the cultivating mode, wherein when in the cultivating mode, the stop plate limits movement of the pump control arm and when in the transport mode, the stop plate allows additional movement of the pump control arm, thereby allowing a greater speed in the transport mode.

5. The apparatus of claim 4, further comprising:
   (a) a bar pivotally mounted proximate its middle section, the bar having a first end that may contact the stop plate in a first direction and a second end that may contact the stop plate in a second direction;
   (b) said pump control arm operatively connected to said bar;
   (c) means for adjusting position of said stop plate, wherein when in a neutral position the distance between said first end and said stop plate is equal to the distance between said second end and said stop plate, whereby the speed is equal in both the first and second direction.

6. The apparatus of claim 5, further comprising means for changing from a transport mode to a cultivating mode, said changing means comprising:
(a) wheels rotatably mounted to said frame; and
(b) means for moving said wheels between an up and a down position, wherein when wheels are in the down position, said frame is raised up.

* * * * *